United States Patent
Innes et al.

(10) Patent No.: US 10,830,403 B2
(45) Date of Patent: Nov. 10, 2020

(54) SELF-POWERED SQUEEZED-LIGHT TEMPERATURE REGULATION DEVICE

(71) Applicant: AT&T Intellectual Property I, L.P., Atlanta, GA (US)

(72) Inventors: Timothy Innes, Atlanta, GA (US); Sara Peek, Atlanta, GA (US); Aubree Doernberg, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/668,799

(22) Filed: Oct. 30, 2019

(65) Prior Publication Data

US 2020/0063930 A1 Feb. 27, 2020

Related U.S. Application Data

(63) Continuation of application No. 15/609,628, filed on May 31, 2017, now Pat. No. 10,480,729.

(51) Int. Cl.
*F21S 9/02* (2006.01)
*H02N 1/08* (2006.01)
(Continued)

(52) U.S. Cl.
CPC .......... *F21S 9/022* (2013.01); *G02F 1/35* (2013.01); *H02N 1/08* (2013.01); *F21Y 2105/00* (2013.01)

(58) Field of Classification Search
CPC ....... H01L 35/325; H02J 7/0042; F21S 9/022; F21S 9/024; F21S 9/00–9/046; H02N 1/04; H02N 1/00–1/12
(Continued)

(56) References Cited

U.S. PATENT DOCUMENTS 7,009,310 B2   3/2006  Cheung et al.
7,471,033 B2  12/2008  Thiesen et al.
(Continued)

FOREIGN PATENT DOCUMENTS

CN   2112738    8/1992
CN  104065301    9/2014
(Continued)

OTHER PUBLICATIONS

Wang, Joseph, "Carbon-Nanotube Based Electrochemical Biosensors: A Review," Electroanalysis, Jan. 2005, vol. 17, No. 1, pp. 7-14.
(Continued)

*Primary Examiner* — Thomas Truong
(74) *Attorney, Agent, or Firm* — Hartman & Citrin LLC

(57) ABSTRACT

Concepts and technologies for a self-powered squeezed-light temperature regulation device are disclosed according various embodiments. The device can include an elastic anchor sheet, a thermostat regulator, a motion power transducer, and a squeezed-light cooling unit. The motion power transducer can be in electrical communication with the thermostat regulator. The squeezed-light cooling unit can be powered by the motion power transducer. The motion power transducer can include a flexible ionic diode that can be located between a first borophene sheet and a second borophene sheet, and a capacitor charge system that can be electrically connected to a collection wire that can direct an electric charge generated by the flexible ionic diode to the capacitor charge system. The squeezed-light cooling unit can include a microwave photon circuit that can create squeezed-light microwave photons and a squeezed-light cooling drum that can be in photonic communication with the microwave photon circuit.

20 Claims, 8 Drawing Sheets

(51) Int. Cl.
  *G02F 1/35* (2006.01)
  *F21Y 105/00* (2016.01)
(58) Field of Classification Search
  USPC .......................................... 310/300; 290/1 R
  See application file for complete search history.

(56) References Cited

U.S. PATENT DOCUMENTS

| | | | |
|---|---|---|---|
| 7,692,366 B2 | 4/2010 | Thiesen | |
| 8,237,324 B2 | 8/2012 | Pei et al. | |
| 8,680,574 B2 | 3/2014 | Hart | |
| 8,912,522 B2 | 12/2014 | Rubloff et al. | |
| 9,204,806 B2 | 12/2015 | Stivoric et al. | |
| 9,636,521 B2 | 5/2017 | Isserow et al. | |
| 2009/0127976 A1* | 5/2009 | Ward | F03G 7/08 310/319 |
| 2011/0043077 A1* | 2/2011 | Yeh | G06F 3/016 310/338 |
| 2011/0181399 A1 | 7/2011 | Pollack et al. | |
| 2015/0068069 A1 | 3/2015 | Tran et al. | |
| 2015/0335096 A1 | 11/2015 | Semperlotti et al. | |
| 2016/0010818 A1 | 1/2016 | Johnson et al. | |
| 2018/0233935 A1* | 8/2018 | Innes | H02N 2/18 |

FOREIGN PATENT DOCUMENTS

| | | |
|---|---|---|
| KR | 101554299 | 9/2015 |
| WO | 2016/149207 | 9/2016 |

OTHER PUBLICATIONS

Clark et al., "Observation of Strong Radiation Pressure Forces from Squeezed Light on a Mechanical Oscillator," Nature Physics, Jan. 11, 2016.

He et al., "Synthetic homeostatic materials with chemo-mechano-chemical self-regulation," Nature, Jul. 12, 2012, vol. 487, pp. 214-218.

Kang et al., "Introduction to carbon nanotube and nanofiber smart materials," Composites Part B: Engineering, Dec. 2006, pp. 382-394.

Clark et al., "Sideband Cooling Beyond the Quantum Limit with Squeezed Light," Nature 541, Jun. 28, 2016, pp. 191-195.

Hou et al., "Flexible Ionic Diodes for Low-Frequency Mechanical Energy Harvesting," Advanced Energy Materials, Nov. 2016.

U.S. Appl. No. 15/609,628 Notice of Allowance dated May 29, 2019.

* cited by examiner

SELF-POWERED SQUEEZED-LIGHT TEMPERATURE REGULATION DEVICE

CROSS-REFERENCE TO RELATED APPLICATIONS

This application is a continuation of and claims priority to U.S. patent application Ser. No. 15/609,628, entitled "Self-Powered Squeezed-Light Temperature Regulation Device," filed May 31, 2017, now U.S. Pat. No. 10,480,729, which is incorporated herein by reference in its entirety.

BACKGROUND

As powered devices become more widely used in daily activities (e.g., the Internet of Things and innovative devices being used in various environments), users expect the powered devices to be available and functional in diverse operating environments. Because some powered devices can be mobile in location and/or placed in rural environments, the need and desire for available power supplies can impact how and where the powered devices are used. Moreover, powered devices can generate and/or be subjected to heat and temperature fluctuations that can affect their operating efficiency. Active temperature regulation of powered devices can consume an amount of power that varies depending on a variety of factors, such as device size and external environment. Furthermore, inadequate temperature regulation of powered devices can reduce the operating lifespan of the powered device. As powered devices operate in various environments, power and temperature regulation needs may continue to evolve.

SUMMARY

The present disclosure is directed to systems, devices, and methods for autonomous self-powered squeezed-light temperature regulation. These self-powered squeezed-light temperature regulation systems, devices, and methods can be implemented in powered devices such as, for example, wired and/or wireless devices. As used herein, the terms "self-powered" or "self-charging" and variants thereof, when used to describe the systems, devices, or methods herein, can be used to refer to an ability to convert energy inputs without requiring the direct input of electrical current and/or charging. As used herein, the term "elastic" and variants thereof, can refer to an ability to bend, stretch, twist, compress, or otherwise flex a material and have the material at least partially return to its original state and/or position. Furthermore, embodiments of the systems and devices illustrated and described herein can be self-powered and/or self-charging and therefore may not require input of electrical current and/or charging.

A self-powered squeezed-light temperature regulation device is disclosed according to various embodiments of the present disclosure. In an embodiment, the self-powered squeezed-light temperature regulation device can include an elastic anchor sheet; a thermostat regulator that can be located adjacent to the elastic anchor sheet; a motion power transducer that can be in electrical communication with or otherwise electrically connected or coupled to the thermostat regulator; and a squeezed-light cooling unit that can be disposed or otherwise located ("disposed") at the elastic anchor sheet and that can be powered by the motion power transducer. The motion power transducer can include a flexible ionic diode that can be located between a first borophene sheet and a second borophene sheet, where the first borophene sheet can be in electrical communication with the thermostat regulator. The motion power transducer can include a capacitor charge system that can be in electrical communication with a collection wire that can direct an electric charge generated by the flexible ionic diode to the capacitor charge system. The squeezed-light cooling unit can include a microwave photon circuit that can create squeezed-light microwave photons. The squeezed-light cooling unit also can include a squeezed-light cooling drum that can be in photonic communication with the microwave photon circuit. The squeezed-light cooling drum can define and otherwise include a drum cavity and can include one or more drum holes through which the squeezed-light microwave photons can leak from the drum cavity.

In some embodiments, the capacitor charge system can include one or more borophene capacitors. In some embodiments, the elastic anchor sheet, the thermostat regulator, the motion power transducer, and the squeezed-light cooling unit can be located within a conductive housing. The conductive housing can define or otherwise include a vent through which the squeezed-light microwave photons can escape from the conductive housing. The vent can be located and/or aligned adjacent to the squeezed light cooling unit.

In some embodiments, the squeezed-light microwave photons can be photonically communicated from the microwave photon circuit to the squeezed-light cooling drum via a photon channel. In some embodiments, the motion power transducer can be connected to the elastic anchor sheet. In some embodiments, movement of the elastic anchor sheet can transfer mechanical energy to the motion power transducer. The motion power transducer can convert mechanical energy to a current using the flexible ionic diode. The motion power transducer can operate in response to movement of the elastic sheet. In some instances, the motion power transducer can respond to movements at various regular and/or irregular frequencies including, but not limited to, frequencies that can be measured as less than one hertz (Hz) and/or up to twenty Hz.

According to one aspect of the concepts and technologies disclosed herein, another embodiment of a self-powered squeezed-light temperature regulation device is disclosed. The self-powered squeezed-light temperature regulation device can include an elastic anchor sheet; a thermostat regulator that can be connected to the elastic anchor sheet; a motion power transducer that can be in electrical communication with the thermostat regulator and that can be located on and/or adjacent to the elastic anchor sheet; and a squeezed-light cooling drum that can be in photonic communication with the microwave photon circuit. The motion power transducer can include a flexible ionic diode that can include nanocomposite electrodes that can be separated by a porous membrane. The flexible ionic diode can be located between a first borophene sheet and a second borophene sheet. The motion power transducer also can include a borophene capacitor that can store an electric charge that can be generated by the flexible ionic diode. The squeezed-light cooling unit can include a microwave photon circuit and a squeezed-light cooling drum that can be in photonic communication with the microwave photon circuit. The microwave photon circuit can create squeezed-light microwave photons. The squeezed-light cooling drum can define a drum cavity and can include one or more drum holes through which the squeezed-light microwave photons can leak from the drum cavity.

In some embodiments, the thermostat regulator can be in electrical communication with the first borophene sheet and can receive power from the borophene capacitor. The borophene capacitor can include an insulating elastic material layer that can be located between two or more borophene plates. In some embodiments, the first borophene sheet and the second borophene sheet can be affixed to one of the nanocomposite electrodes. In some embodiments, the self-powered squeezed-light temperature regulation device further can include a collection wire that can be in electrical communication with the second borophene sheet. The collection wire can direct the electric charge from the flexible ionic diode to the borophene capacitor. In some embodiments, the elastic anchor sheet, the thermostat regulator, the motion power transducer, and the squeezed-light cooling unit can be located within a conductive housing.

In some embodiments, the elastic anchor sheet can include one or more flexible ionic diodes, each of the flexible ionic diodes can be in electrical communication with one or more squeezed-light cooling unit. In some embodiments, the thermostat regulator can regulate an electric current that can be provided to one or more squeezed-light cooling unit. In some embodiments, movement of the elastic anchor sheet can transfer or otherwise provide mechanical energy to the motion power transducer via the first borophene sheet. In some embodiments, the motion power transducer can convert the mechanical energy to an electric current using the flexible ionic diode. The movement can occur in various frequencies (regular or irregular) including, but not limited to, a frequency that can be measured as less than one Hz and/or can be measured up to twenty Hz.

According to yet another aspect, another embodiment of a self-powered squeezed-light temperature regulation device is disclosed. In an embodiment, a self-powered squeezed-light temperature regulation device can include a conductive housing, an elastic anchor sheet, a thermostat regulator, one or more motion power transducers, and a squeezed-light cooling unit. The conductive housing can include or otherwise define a cavity. The elastic anchor sheet can be located within the cavity. The thermostat regulator and one or more motion power transducers can also be attached to the elastic anchor sheet. One or more of the motion power transducers can be in electrical communication with the thermostat regulator. One or more of the motion power transducers can generate an electrical current in response to movement of the conductive housing. In some embodiments, the movement can transfer mechanical energy at a frequency. The frequency can include various irregular and/or regular frequencies that can be measured and can be less than one hertz. The squeezed-light cooling unit can receive electrical current that is generated by one or more of the motion power transducers. The squeezed-light cooling unit can include or otherwise define a drum cavity. The squeezed-light cooling unit can create squeezed-light microwave photons that can escape from the drum cavity of the squeezed-light cooling unit. In some embodiments, one or more of the motion power transducers can generate the electrical current using a flexible ionic diode that can be located between two or more borophene sheets.

Other systems, devices, methods, and/or computer program products according to embodiments will be or become apparent to one with skill in the art upon review of the following drawings and detailed description. It is intended that all such additional systems, devices, methods, and/or computer program products be included within this description and within the scope of this disclosure.

DETAILED DESCRIPTION

Figure 1A:
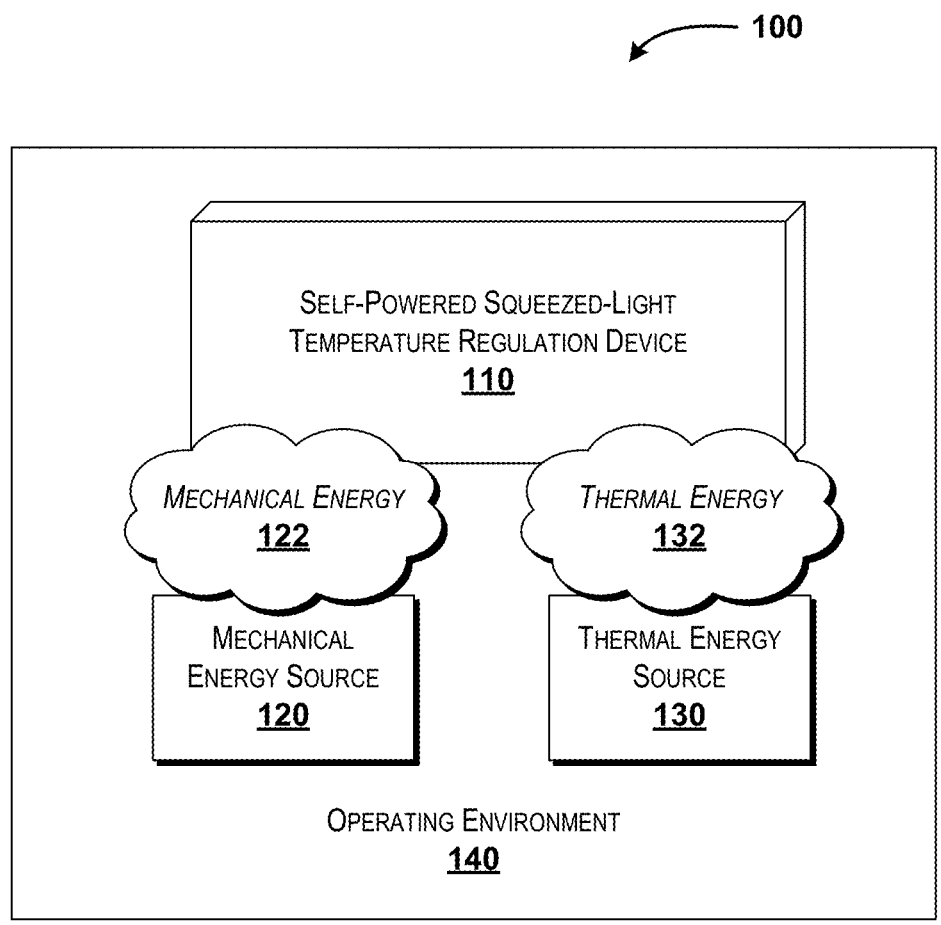
FIG. 1A is a system diagram illustrating a self-powered squeezed-light temperature regulation device exposed to mechanical and/or thermal energy in an operating environment, according to some example embodiments of the concepts and technologies described herein.

The following detailed description is directed to systems and methods for autonomous self-powered squeezed-light temperature regulation. Embodiments of the present disclosure can provide temperature regulation for powered devices that can be sensitive to heat fluctuations. The temperature regulation can pertain to thermodynamic cooling and can be provided using the system's own power generation without having to exclusively rely on an external power. Some embodiments of the systems disclosed herein can include a motion power transducer that can harness low-frequency movements to power a squeezed-light cooling unit that can provide temperature regulation via thermodynamic cooling. The motion power transducer and squeezed-light cooling unit can be coupled to a thermostat regulator and can be attached to an elastic anchor sheet. The elastic anchor sheet, having the motion power transducer, the squeezed-light cooling unit, and the thermostat regulator attached thereon, can be located within a conductive housing to facilitate temperature regulation.

Mechanical movements, such as but not limited to low-frequency vibrations at or near the conductive housing, can be translated or otherwise transferred via the elastic anchor sheet to the motion power transducer. Conventional mechanical energy harnessing devices (e.g., conventional piezoelectric transducers) typically require mechanical movements with relatively "high" frequencies, meaning movements having frequencies greater than 20 Hertz (Hz) or vibrations per second in order to generate maximum power density output. This is because these conventional mechanical energy harnessing devices experience a dramatic drop in power density output (i.e., output of voltage and/or current over a defined region) in response to the frequency of the movement being below 20 Hz, and such devices do not provide maximum power density output when a frequency of the movement is below 10 Hz, much less below 1 Hz. In some embodiments, the motion power transducer can be configured to operate in response to movements having frequencies that can range from less than 1 Hz up to 20 Hz. Embodiments of the present disclosure include a self-powered squeezed-light temperature regulation device that can have a motion power transducer that is configured to harness mechanical energy with frequencies measured below 20 Hz and can generate maximum power density output in response to movements at frequencies that are less than 20 Hz. In some embodiments, a self-powered squeezed-light temperature regulation device can have a motion power transducer that can operate with maximum power density output (e.g., generate an electric charge at maximum efficiency) as a result of movements having been applied with frequencies measured as being less than one hertz (Hz), such as frequencies between 0.1 µHz to 1 Hz. Examples of mechanical energy movements that provide mechanical energy at frequencies measured as less than 20 Hz include, but are not be limited to, body movements, muscle contractions, movements due to air flow, movements due to rainfall, movements from some rotational equipment, movements due to ocean waves, movements due to wind, human motions, and other movements from other sources that can produce frequencies that can be measured from 20 Hz down to only portions of one Hz (e.g., 0.15 Hz, 0.248 Hz, 0.15 µHz, etc.). Unlike some conventional mechanical energy harness devices, such as triboelectric generators, the systems and components (e.g., the motion power transducer) disclosed herein do not involve wearing of material surfaces to provide energy generation and/or conversion, and thus embodiments of the present disclosure can be implemented to provide temperature regulation in long-term operations under extensive use.

Embodiments of the present disclosure can provide a motion power transducer that can include a flexible ionic diode that can have two or more nanocomposite electrodes filled with oppositely charged mobile ions. The two or more nanocomposite electrodes can be separated by a porous membrane. The nanocomposite electrodes can include a polymeric matrix filled with nanotubes, and the nanotubes can be filled with ionic liquids. In some embodiments, one or more of the nanotubes can be carbon nanotubes. When a low-frequency movement (e.g., mechanical vibrations, forces, etc.) acts on the elastic anchor sheet (thereby transferring mechanical energy to the motion power transducer), the mobile ions in one or more nanocomposite electrode can diffuse across the porous membrane, which in turn can create an electric charge that can provide current. One or more nanocomposite electrode can be attached to a borophene sheet. The borophene sheet can collect the electric charge generated by the flexible ionic diode. One borophene sheet can be affixed to the nanocomposite electrode having mobile ions with a negative charge (e.g., negative mobile ions), and this borophene sheet can be in electrical communication with the thermostat. The other borophene sheet can be affixed to the nanocomposite electrode having mobile ions with a positive charge (e.g., positive mobile ions), and this borophene sheet can be in electrical communication with a collection wire that can direct the electric current to a capacitor charge system. In some embodiments, the capacitor charge system can include one or more borophene capacitors that can store the electric current generated by the flexible ionic diode. Thus, the motion power transducer can allow for capturing of low-frequency movements and converting mechanical energy that the low-frequency movements provide into current and/or voltage that can be directed, stored, and/or otherwise used to power a squeezed-light cooling unit. In some embodiments, the motion power transducer may be referred to as a slow-motion power transducer.

The thermostat regulator can activate and/or otherwise initiate a squeezed-light cooling unit, which in turn can act as a heat sink to provide thermodynamic cooling to a thermal energy source and/or the environment surrounding the self-powered squeezed-light temperature regulation device. The squeezed-light cooling unit can include a quantum electrodynamic microwave photon circuit (referred to as a microwave photon circuit) that can be configured to draw and/or receive power (e.g., electric current) generated by the motion power transducer. The microwave photon circuit can create squeezed-light microwave photons, which can be microwave photons that have been "squeezed" by purifying the photons, thereby stripping them of intensity fluctuations. The squeezed-light microwave photons can be directed to a squeezed-light cooling drum that can define a drum cavity in which the squeezed-light microwave photon bounce around, absorbing thermal energy (e.g., heat) from the surface of the squeezed-light cooling drum. The squeezed-light cooling drum can be nanoscopic or microscopic in size and can be configured as a vibrating mechanical drum that oscillates using the squeezed-light microwave photons. The squeezed-light cooling drum can include one or more drum holes through the surface of the drum. The drum holes can allow the photons that entered the squeezed-light cooling drum to escape or otherwise leak from the squeezed-light cooling drum. The temperature of the surface of the squeezed-light cooling drum can cool as the squeezed-light microwave photons leak out of the drum cavity due to the absorbed energy leaving with the squeezed-light microwave photons. This allows the environment surrounding or otherwise proximate to the squeezed-light cooling drum (e.g., a thermal energy source exterior to the conductive housing) to transfer thermal heat to the squeezed-light cooling drum, thereby providing thermodynamic cooling to the surrounding environment. As such, embodiments of the present disclosure can provide autonomous self-powered squeezed-light temperature regulation systems, devices, and methods that can provide benefits such as allowing for increased sensitivity in sensors, providing more efficient wireless links due to adequate cooling of powered devices, reducing clock drift in processors, and extending battery usage of powered devices due to embodiments of the present disclosure promoting a self-reliant power source.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and other particularized, non-generic machines.

Referring now to FIG. 1A, aspects of a self-powered squeezed-light temperature regulation system 100 will be described (hereinafter referred to as a "system 100"), according to an illustrative embodiment of the concepts and technologies disclosed herein. As will be explained in more detail herein, the system 100 shown in FIG. 1A is one example embodiment of the concepts and technologies described herein and therefore should not be construed as being limiting in any way.

In the embodiment shown in FIG. 1A, the system 100 includes a self-powered squeezed-light temperature regulation device 110. In various embodiments, the system 100 also can include a mechanical energy source 120. The mechanical energy source 120 can be a source of mechanical energy 122. In some embodiments, at least some of the mechanical energy 122 can be conducted, translated, or otherwise transferred to the self-powered squeezed-light temperature regulation device 110 through movements provided, at least in part, by the mechanical energy source 120. As used herein, the term "movements" and/or "mechanical movements" refers to the application and transfer of at least a portion of mechanical energy (e.g., forces) from a mechanical energy source (e.g., mechanical energy source 120). In general, a source of mechanical energy can generate movements of almost any nature with varied frequencies. In various embodiments of the concepts and technologies disclosed herein, movements that provide the mechanical energy 122 can be measured at various frequencies including, but not limited to, frequencies that can be measured as less than 20 Hz and even as low as portions of 1 Hz (e.g., 0.1 Hz, 0.1 µHz, 10 µHz, etc.). As such, in some embodiments, movements from a mechanical energy source, such as the mechanical energy source 120, that transfers mechanical energy, such as the mechanical energy 122, that can be measured as being less than 20 Hz can be referred to herein as "low-frequency movements." In various embodiments, the mechanical energy source 120 that can provide low-frequency movements can correspond to one or more of a human body, machinery, an electronic device, wind, water, a building, rotating objects, engines, vibration sources, animals, geological and/or weather events that produce microseisms (e.g., a volcanic eruption, the shifting of tectonic plates, a landslide, an avalanche, a tsunami, a tornado, a hurricane, etc.), a moving part of any device, combinations thereof, or any other source of the mechanical energy 122 that can generate and translate low-frequency movements that can be imparted as the mechanical energy 122 acting on a self-powered squeezed-light temperature regulation device, such as the self-powered squeezed-light temperature regulation device 110. Further discussion of the mechanical energy source 120 and the mechanical energy 122 is provided herein with respect to FIG. 2.

In various embodiments, the system 100 also can include a thermal energy source 130. The thermal energy source 130 can be a source of thermal energy 132. The thermal energy 132 can be radiant energy in the form of heat that can act upon an object in an operating environment, such as heat being transferred to the self-powered squeezed-light temperature regulation device 110. In some embodiments, the thermal energy source 130 can correspond to a human body and the thermal energy 132 can correspond to body heat. In some other embodiments, the thermal energy source 130 can correspond to an exhaust system for an electronic device (e.g., a heat exhaust of a computer device, a heat exhaust of a television or display, or other electronics); a heat exhaust for a mechanical device (e.g., a heat exhaust for a refrigerator, an exhaust for an automobile or component thereof, a heat exhaust for a lighting device, or other mechanical device); a surface of a powered device (e.g., the surface of a power supply, processor, integrated circuit, or the like); a moving part of any device; a thermal sink or other thermal output for any device; combinations thereof; or the like. In light of the various examples set forth herein with respect to the mechanical energy source 120 and the thermal energy source 130, it should be understood that according to various embodiments, the source of the mechanical energy 122 (e.g., the mechanical energy source 120) can be the same as the source of the thermal energy 132 (e.g., the thermal energy source 130), and therefore in some embodiments the mechanical energy source 120 is also the thermal energy source 130.

The system 100 can include an operating environment 140 where one or more of the self-powered squeezed-light temperature regulation device 110 is located. As used herein, an operating environment 140 refers to a location in which a self-powered squeezed-light temperature regulation device 110 is present and exposed to and/or acted upon by mechanical energy 122 and/or thermal energy 132 from a mechanical energy source 120 and thermal energy source 130, respectively. Therefore, the operating environment 140 can be a location in which the self-powered squeezed-light temperature regulation device 110 can facilitate temperature regulation. As shown in FIG. 1A, the mechanical energy source 120 and the thermal energy source 130 are illustrated as being located within the operating environment 140 at a short distance away from the self-powered squeezed-light temperature regulation device 110. However, it must be understood that the embodiment shown is for illustration purposes and should not be construed as conveying a limited distance in any way. In some embodiments, the mechanical energy source 120 and/or the thermal energy source 130 can be located at various distances from the self-powered squeezed-light temperature regulation device 110 while still providing the mechanical energy 122 and/or the thermal energy 132 within the operating environment 140. As such, the illustrated embodiment must be understood as being illustrative and should not be construed as being limiting in any way.

It must be understood that the mechanical energy source 120 and the thermal energy source 130 can impart or otherwise transfer the mechanical energy 122 and the thermal energy 132, respectively, onto the self-powered squeezed-light temperature regulation device 110 at distances anywhere from less than one inch to tens of thousands of miles. By way of illustration and without limitation, the thermal energy source 130 can include a communication device having a processor that generates the thermal energy 132 in the form of heat, and the mechanical energy source 120 can include a highway with vehicles moving on a road surface that produce microseisms, which are low-frequency movements in the form of ground tremors that transfer the mechanical energy 122 to the self-powered squeezed-light temperature regulation device 110. In this example, the self-powered squeezed-light temperature regulation device 110 can be located within the communication device, and thus the distance separating the self-powered squeezed-light temperature regulation device 110 from the thermal energy source 130 (in this example the processor of the communication device) can be less than one inch. Additionally, the highway with vehicles traveling thereon can be one mile away from the self-powered squeezed-light temperature regulation device 110. Despite the difference in distances, it should be understood that in this example, the thermal energy 132 (here the heat from the processor of the powered device) and the mechanical energy 122 (here the microseisms from the highway) can still be transferred to, and act upon, the self-powered squeezed-light temperature regulation device 110. Therefore, in this example, the operating environment 140 can include the self-powered squeezed-light temperature regulation device 110 acted upon by the highway as the mechanical energy source 120, and the processor and powered device as the thermal energy source 130. It must be understood that the above example is illustrative and for clarification purposes only, and therefore should not be construed as being limiting in any way.

It must be understood that although the system 100 shows one operating environment 140, one self-powered squeezed-light temperature regulation device 110, one mechanical energy source 120 providing one application of the mechanical energy 122, and one thermal energy source 130 providing one application of the thermal energy 132, various embodiments of the concepts and technologies disclosed herein include versions of the system 100 having almost any number of self-powered squeezed-light temperature regulation devices 110, mechanical energy sources 120 providing one or more applications of mechanical energy 122, and thermal energy sources 130 providing one or more applications of thermal energy 132, where the number includes tens, hundreds, thousands, millions, or even more. As such, the illustrated embodiment must be understood as being illustrative and should not be construed as being limiting in any way.

Figure 1B:
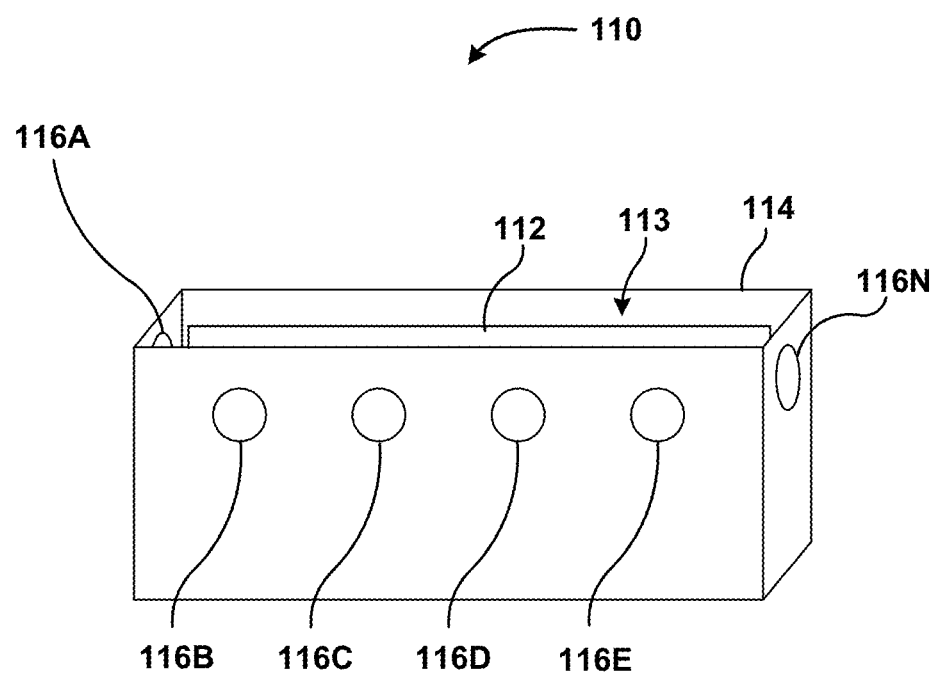
FIG. 1B is a line diagram illustrating an assembly for a self-powered squeezed-light temperature regulation device, according to an example embodiment of the concepts and technologies described herein.

Turning to FIG. 1B with continued reference to FIG. 1A, a self-powered squeezed-light temperature regulation device, such as the self-powered squeezed-light temperature regulation device 110, is disclosed, according to an example embodiment of the concepts and technologies described herein. In various embodiments, the self-powered squeezed-light temperature regulation device 110 can include a conductive housing 114. The conductive housing 114 can be formed from a material, such as an elastic material, that is conductive of mechanical energy and/or thermal energy (e.g., mechanical energy 122 and/or thermal energy 132) from mechanical and/or thermal energy sources (e.g., mechanical energy source 120 and/or thermal energy source 130). In some embodiments, at least part of the elastic material can include borophene. Put another way, in some embodiments, the conductive housing 114 can be formed from borophene. The conductive housing 114 can be conductive of mechanical energy from a mechanical energy source and/or thermal energy from a thermal energy source (e.g., mechanical energy source 120 and thermal energy source 130). The conductive housing 114 can be flexible (e.g., bendable, twistable, compressible, and stretchable) and can be bent, twisted, stretched, compressed, and/or otherwise flexed to transfer and translate forces, torques, vibrations, or other movements that can provide mechanical energy in and/or along various axes of the conductive housing 114. The flexibility of the conductive housing 114 can allow for movements to be conducted, transferred, or otherwise translated from a mechanical energy source (e.g., mechanical energy 122 transferred from mechanical energy source 120) to an elastic anchor sheet, such as the elastic anchor sheet 112.

In the illustrated embodiment, the conductive housing 114 includes six or more vents, specifically shown as vents 116A-116N (hereinafter collectively and/or generically referred to as "vents 116"). It should be understood, however, that the conductive housing 114 can include one, two, three, four, five, six, or more than six of the vents 116, and as such, the illustrated embodiment should be understood as being merely illustrative of the concepts and technologies disclosed herein. The vents 116 can include passages that can extend through a surface of the conductive housing 114. Although the illustrated embodiment of the vents 116 are shown as being formed with a circular shape, it must be understood that alternate embodiments may include the vents 116 having different shapes. Similarly, although the illustrated embodiments of the conductive housing 114 and the elastic anchor sheet 112 are shown as having a substantially rectangular shape, it must be understood that alternate embodiments of the conductive housing 114 and/or the elastic anchor sheet 112 having different shapes are possible and are contemplated. In particular, embodiments of the conductive housing 114 and the elastic anchor sheet 112 can have shapes with irregular geometry (e.g., non-uniform shapes). Additionally, the size of the system 100 and its components is illustrated for clarity and is not intended to convey proportionality between and/or among the components of the system 100 discussed herein. As such, the illustrated embodiment should be understood as being illustrative, and should not be construed as being limiting in any way.

According to various embodiments, two or more surfaces of the conductive housing 114 can define a cavity 113 in which the elastic anchor sheet 112 can be located or otherwise disposed within. In some embodiments, the elastic anchor sheet 112 can be joined, attached, connected, and/or otherwise affixed to a surface of the conductive housing 114 within the cavity 113. The elastic anchor sheet 112 can be formed in any desired size, based on size requirements and/or size preferences. According to some embodiments of the concepts and technologies disclosed herein, the elastic anchor sheet 112 can be formed from a material, such as but not limited to borophene, that can be mechanically and/or thermally conductive. According to some other embodiments of the concepts and technologies disclosed herein, the elastic anchor sheet 112 can be formed from a material that can be electrically conductive and/or superconductive. In some embodiments, the elastic anchor sheet 112 can be aligned with the vents 116 to allow for thermodynamic heat transfer and cooling of the surrounding environment, such as cooling of the thermal energy source 130 and/or the operating environment 140. Moreover, it must be understood that the conductive housing 114 can include a top surface such that the cavity 113 is enclosed and the elastic anchor sheet 112 is surrounded by surfaces of the conductive housing 114. It must be understood that these examples are illustrative, and therefore should not be construed as being limiting in any way.

Figure 1C:
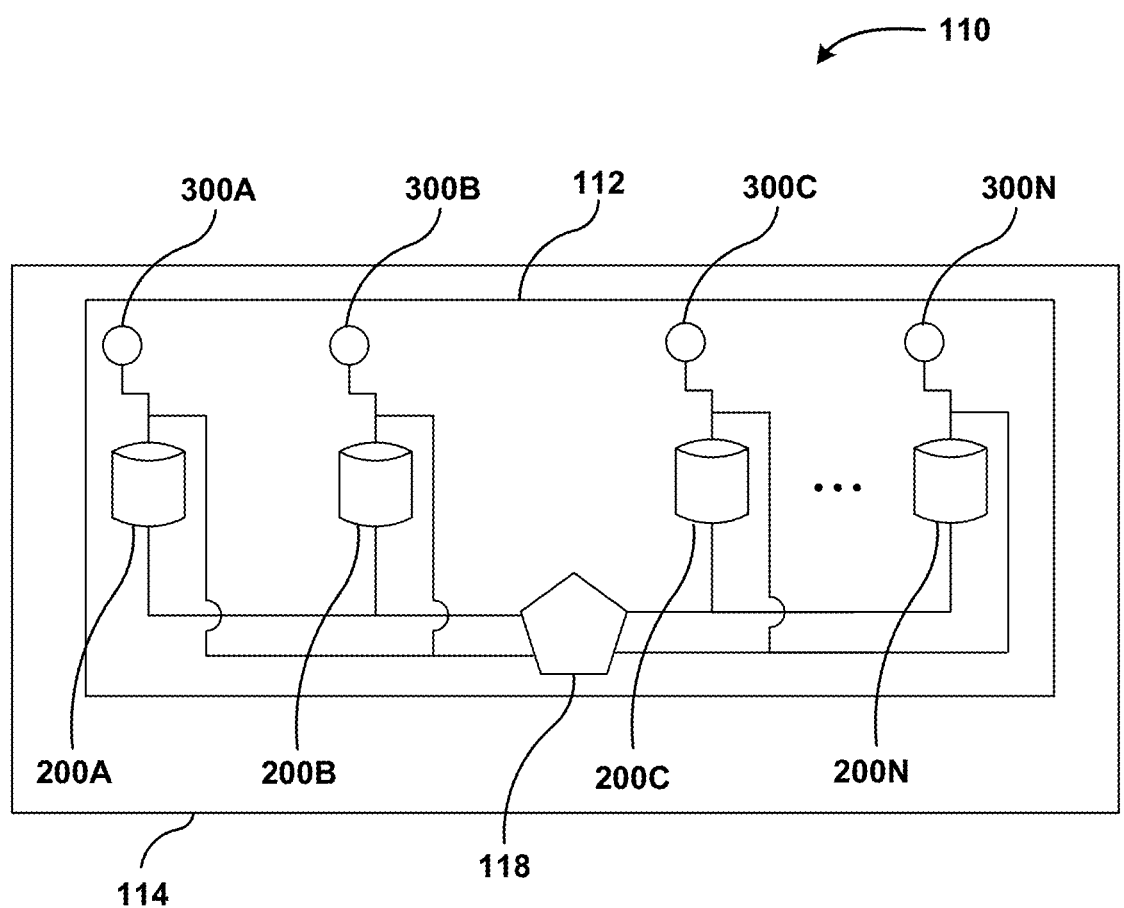
FIG. 1C is a line diagram illustrating a cross-sectional layout of components for a self-powered squeezed-light temperature regulation device, according to an example embodiment of the concepts and technologies described herein.

Turning now to FIG. 1C with continued reference to FIGS. 1A-1B, a cross-sectional layout of components for a self-powered squeezed-light temperature regulation device, such as the self-powered squeezed-light temperature regulation device 110, is disclosed, according to an example embodiment of the concepts and technologies described herein. FIG. 1C shows an elastic anchor sheet, such as the elastic anchor sheet 112, located on a surface of the conductive housing 114 of the self-powered squeezed-light temperature regulation device 110. In some embodiments, one or more walls of the conductive housing 114 can be the substrate for affixing or otherwise locating the elastic anchor sheet 112 within the conductive housing 114. It should be noted that some embodiments of the self-powered squeezed-light temperature regulation device 110 can have one or more walls or other surfaces of the conductive housing 114 forming the elastic anchor sheet 112. According to various embodiments, the elastic anchor sheet 112 and/or the conductive housing 114 can be flexible to further facilitate transfer of movements (e.g., mechanical energy 122) from the conductive housing 114 to the elastic anchor sheet 112. The elastic anchor sheet 112 can be provided to act as a substrate, "backbone," platform, or other support structure of and/or for one or more motion power transducers 200A-200N, squeezed-light cooling units 300A-300N, and/or a thermostat regulator 118. As such, the elastic anchor sheet 112 can be the substrate to which the motion power transducers 200A-200N, the squeezed-light cooling units 300A-300N, and/or the thermostat regulator 118 can be joined, attached, anchored, connected, disposed and/or otherwise located.

As shown in FIG. 1C, the elastic anchor sheet 112 can include an array of the motion power transducers 200A-200N. One or more (or each) of the motion power transducers 200A-200N can be attached or otherwise connected to one or more (or a respective) of the squeezed-light cooling units 300A-300N. For clarity, the motion power transducers 200A-200N are illustrated and described as being substantially similar to each other, and will generically be referred to as embodiments of a motion power transducers 200 (which will be further discussed with respect to FIG. 2). Similarly, the squeezed-light cooling units 300A-300N are illustrated and described as being substantially similar to each other, and will generically be referred to as embodiments of a squeezed-light cooling unit 300 (which will be further discussed with respect to FIG. 3). It should be understood, however, that variations among the motion power transducers 200 and the squeezed-light cooling units 300 are possible and are contemplated. Although the illustrated embodiment of the self-powered squeezed-light temperature regulation device 110 is shown as including four motion power transducers 200 and four squeezed-light cooling units 300, it should be understood that the number of motion power transducers 200 and squeezed-light cooling units 300 can be varied as desired to satisfy various constraints, including but not limited to, power requirements, power preferences, cooling requirements, aesthetic preferences, aesthetic requirements, size requirements, size preferences, combinations thereof, or the like. Various embodiments of the concepts and technologies disclosed herein include versions of the self-powered squeezed-light temperature regulation device 110 having almost any number of motion power transducers 200 and squeezed-light cooling units 300, including tens, hundreds, thousands, millions, or even more. As such, the illustrated embodiment must be understood as being illustrative and should not be construed as being limiting in any way.

Figure 5:
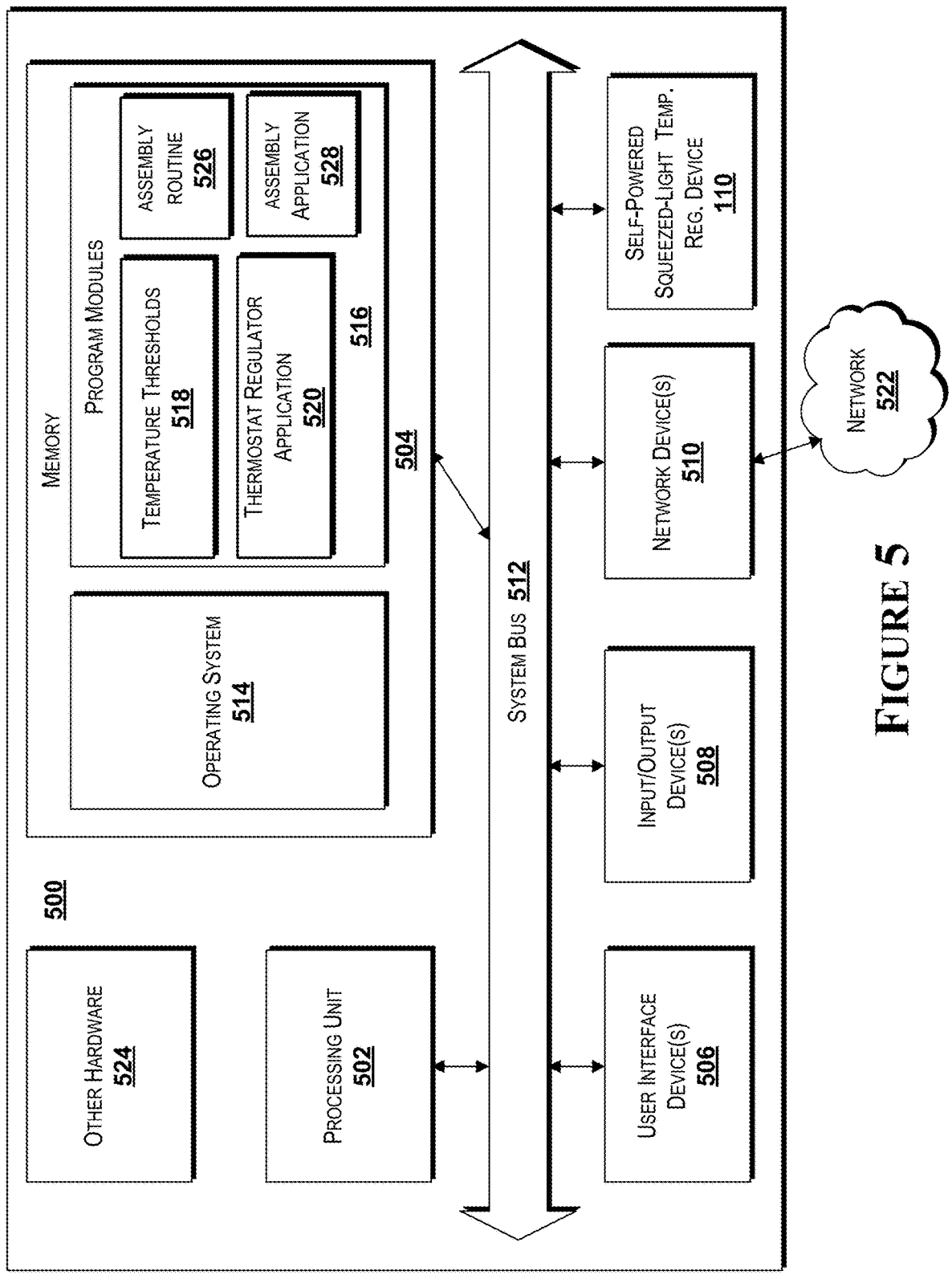
FIG. 5 is a block diagram illustrating an example powered device operable to provide an example operating environment in which embodiments of a self-powered squeezed-light temperature regulation device can be located, according to an illustrative embodiment of the concepts and technologies disclosed herein.

The thermostat regulator 118 can be electrically connected, coupled, or otherwise in electrical communication with one or more of the motion power transducer 200 and one or more of the squeezed-light cooling unit 300. In various embodiments, the thermostat regulator 118 can be powered, at least in part, by one or more of the motion power transducer 200. The thermostat regulator 118 can be configured to control a switch 226 (shown in FIG. 2) that can activate one or more of the squeezed-light cooling unit 300. In some embodiments, the thermostat regulator 118 may be connected to various components of a powered device, such as illustrated in FIG. 5. The thermostat regulator 118 can be electrically coupled to the switch 226 illustrated and described in FIG. 2.

Figure 2:
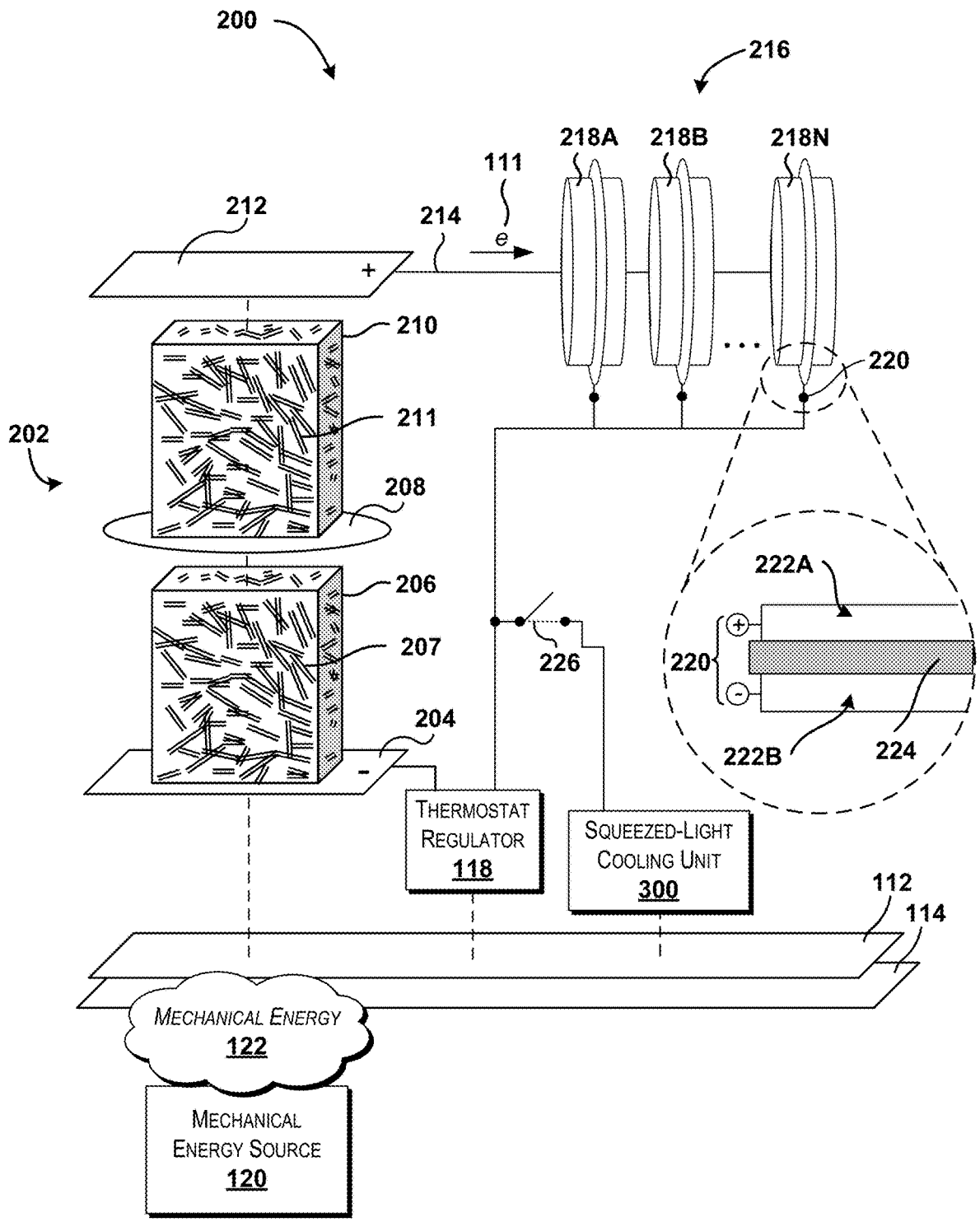
FIG. 2 is a line drawing illustrating aspects of a motion power transducer operable in a self-powered squeezed-light temperature regulation device, according to some example embodiments of the concepts and technologies disclosed herein.

Turning now to FIG. 2 with continued reference to FIGS. 1A-1C, a motion power transducer 200 is disclosed. In various embodiments, the motion power transducer 200 is configured to harness "low-frequency" mechanical movements that can provide mechanical energy, such as the mechanical energy 122, for the motion power transducer 200, such as by the motion power transducer 200 converting the mechanical energy 122 into an electric charge e 111 (e.g., current and/or voltage) for storage and use. As used herein, the term "low-frequency" refers to frequencies that are no greater than 20 Hz, such as frequencies that are less than 1 Hz (e.g., 0.10 Hz, 0.25 Hz, 0.857 Hz, 0.1 µHz, etc.) and up to 20 Hz. As shown in FIG. 2, the mechanical energy source 120 can be the source of mechanical movements that can be measured as being no greater than 20 Hz. The mechanical energy source 120 can be the source of low-frequency mechanical movements, and in some embodiments, provides movements that can be measured at frequencies less than 1 Hz. The mechanical energy source 120 can generate mechanical movements that can transfer the mechanical energy 122 to the motion power transducer 200 via one or more of a borophene sheet 204, the elastic anchor sheet 112, and/or the conductive housing 114 of a self-powered squeezed-light temperature regulation device, such as the self-powered squeezed-light temperature regulation device 110. Examples of low-frequency movements include, but should not be limited to, body movements, muscle contractions, air flow, rainfall, rotational equipment, ocean waves, wind, fan rotations, device vibrations, geological vibrations, human motions, and other movements producing repetitive forces. It should be understood that these examples are illustrative, and therefore should not be construed as being limiting in any way.

The mechanical energy 122 can include movements that produce low-frequencies. For example, the mechanical energy source 120 can provide movements having mechanical energy 122 with frequencies that are portions of 1 Hz (e.g., 0.7 Hz, 0.155 Hz, etc.). The movements provided by the mechanical energy source 120 can have regular and/or irregular frequencies, which can be measured as occurring at less than 20 Hz, and may include frequencies that can be measured as occurring at less than 1 Hz. In some embodiments, the mechanical energy source 120 can provide the mechanical energy 122 in the form of a compressive force that can be transferred to and/or that can act on the motion power transducer 200 over various regular and/or irregular time intervals, and therefore can provide movements that are of low-frequency. The motion power transducer 200 can convert the mechanical energy 122 from movements into an electric charge e 111 (e.g., electric current and/or voltage), which can be output as a direct current (DC) and can be stored in a capacitor charge system 216. In some embodiments, the output of the electric charge e 111 can include a continuous direct current. In various embodiments of the present disclosure, the motion power transducer 200 can convert the mechanical energy 122 to an electric charge e 111 and have a power density output that peaks (i.e., is maximized) as a result of movements that are applied to the elastic anchor sheet 112 with frequencies no greater than 1 Hz (e.g., 0.1 µHz-1 Hz), no greater than 10 Hz (e.g., 0.1 µHz-10 Hz), and/or no greater than 20 Hz (e.g., 0.1 µHz-20 Hz).

The motion power transducer 200 can include a flexible ionic diode 202. The flexible ionic diode 202 can include two or more nanocomposite electrodes, specifically a nanocomposite negative electrode 206 and a nanocomposite positive electrode 210. One or more (or each) of the nanocomposite negative electrode 206 and the nanocomposite positive electrode 210 can include an ionic polymeric matrix filled or otherwise embedded with multi-walled nanotubes (referred to hereinafter as "nanotubes"). In some embodiments, the nanotubes can be formed from carbon. As illustrated in FIG. 2, the nanocomposite negative electrode 206 can include a polymeric matrix having nanotubes filled with liquid negative ions 207 (e.g., ionic liquids having mobile ions with a negative charge). As such, in some embodiments, a nanocomposite electrode may be referred to as a "nanocomposite negative electrode" due to nanotubes filled with liquid negative ions 207 being embedded in a polymeric matrix. Comparatively, the nanocomposite positive electrode 210 can include a polymeric matrix having nanotubes filled with liquid positive ions 211 (e.g., ionic liquids having mobile ions with a positive charge). As such, in some embodiments, a nanocomposite electrode may be referred to as a "nanocomposite positive electrode" due to the presence of nanotubes filled with the liquid positive ions 211 being embedded in a polymeric matrix. In various embodiments, examples of ionic liquids include, but are not limited to, 1-butyl-3-methylimidazolium tetrafluoroborate ($BMIBF_4$) and 1-ethyl-3-methylimidazolium bis(triflouromethlysulfonyl)imide (EMITFSI). The liquid negative ions 207 and the liquid positive ions 211 filling the carbon nanotubes of the nanocomposite negative electrode 206 and the nanocomposite positive electrode 210, respectively, can collectively and/or generically be referred to as mobile ions.

The nanocomposite negative electrode 206 and the nanocomposite positive electrode 210 can be separated by a porous membrane 208. The porous membrane 208 can be configured to be a semi-permeable separator that can be permeable to the mobile ions (e.g., 207, 211) while acting as a separator between the two adjacent nanocomposite electrodes (e.g., 206, 210). In some embodiments, the porous membrane 208 includes a polycarbonate membrane. In various embodiments, the flexible ionic diode 202 can be disposed or otherwise located between two borophene sheets, specifically the borophene sheet 204 and a borophene sheet 212. In the claims, the borophene sheet 204 or the borophene sheet 212 may be referred to as a first borophene sheet or a second borophene sheet. It is understood that use of the terms "first" and "second" are for clarification purposes only, and should not be construed as limited to a ranking, a spatial or relative location, an order of importance, or any other aspects of these elements.

As illustrated in FIG. 2, the borophene sheet 204 can be located, attached, and/or otherwise disposed at, near, or against the nanocomposite negative electrode 206. Similarly, the borophene sheet 212 can be located, attached, and/or otherwise disposed at, near, or against the nanocomposite positive electrode 210. According to various embodiments, the elastic anchor sheet 112 can be located, attached, and/or otherwise disposed adjacent to the borophene sheet 204. One or more (or each) of the borophene sheet 204 and the borophene sheet 212 can be formed in any desired size, based on size requirements and/or size preferences. The borophene sheets 204, 212 can be formed using various processes and/or operations. In one contemplated embodiment, a borophene sheet (e.g., the borophene sheet 204 and/or the borophene sheet 212) can be formed by depositing boron onto a silver substrate. Borophene can have a thickness of one atom and can be flexible. Also, borophene can be thermally conductive, electrically conductive, and/or mechanically conductive (e.g., borophene can transfer mechanical energy from movements). In fact, in some embodiments, borophene may be highly conductive and potentially superconductive. Thus, the borophene sheet 204 and the borophene sheet 212 can be provided to collect electrical energy (e.g., electrical current and/or voltage generated by the flexible ionic diode 202).

FIG. 2 illustrates an embodiment of the borophene sheet 204 and the borophene sheet 212 in the form of a flat sheet. It should be understood that the borophene sheet 204 and/or the borophene sheet 212 can have a thickness that varies in size. In some embodiments, the borophene sheet 204 and/or the borophene sheet 212 can take the form of and/or be considered a two-dimensional material, (i.e., materials that can have a thickness of one atom). In some embodiments, another material may be substituted for the borophene included in the borophene sheet 204 and/or the borophene sheet 212. For example, some contemplated embodiments of the concepts and technologies disclosed herein may use graphene or other structures instead of borophene and/or in addition to borophene. In the claims, however, the word "borophene" is used to refer exclusively to "borophene" and excludes graphene and other existing two-dimensional materials.

Prior to the mechanical energy source 120 providing the mechanical energy 122 to the flexible ionic diode 202 via the borophene sheet 204 and the elastic anchor sheet 112, the flexible ionic diode 202 can establish a potential that opposes ion diffusion due to a concentration gradient of mobile ions (e.g., from the liquid negative ions 207 and/or the liquid positive ions 211) across the porous membrane 208. In response to a mechanical energy source, such as the mechanical energy source 120, providing the mechanical energy 122 to the elastic anchor sheet 112 (for example a compressive movement with a frequency of less than 1 Hz), the mechanical energy 122 can be translated, transferred, or otherwise act upon the elastic anchor sheet 112, through the borophene sheet 204, and into the nanocomposite negative electrode 206 and/or the nanocomposite positive electrode 210. In turn, the mechanical energy 122 can compress the nanocomposite negative electrode 206 and the nanocomposite positive electrode 210 such that the volumetric ion concentrations in both the nanocomposite electrodes 206, 210 change correspondingly due to their change in volume. Prior to returning to an equilibrium state (i.e., a state in which the mechanical energy 122 is at least temporarily not applied so as to relieve compressive forces on the flexible ionic diode 202), the directional flow of mobile ions can yield electrical current and voltage output from the flexible ionic diode 202, shown as the electrical charge e 111. Stated differently, the flexible ionic diode 202 can create, convert, or otherwise generate an electric charge e 111 in response to or otherwise as a result of being acted on by the mechanical energy 122, which in some embodiments includes mechanical energy that provides movement to the flexible ionic diode 202 at a frequency of less than 1 Hz (e.g., a portion of 1 Hz).

As illustrated in FIG. 2, the borophene sheet 212 can be disposed, attached, and/or otherwise located on and/or adjacent to the nanocomposite positive electrode 210. Although one flexible ionic diode 202 is shown in FIG. 2, it should be understood that other embodiments may include two or more flexible ionic diodes 202 connected in parallel to one or more borophene sheet 212. As shown in FIG. 2, the borophene sheet 212 can collect the electric charge e 111 generated by one or more flexible ionic diode 202. According to various embodiments, a collection wire 214 can be disposed or otherwise located at an end of the borophene sheet 212. The electric charge e 111 (e.g., current and/or voltage) generated by the flexible ionic diode 202 can be directed to a storage device. In some embodiments, the storage device can be in electrical communication with two or more borophene sheets 212 and can store an electric charge e 111 from two or more flexible ionic diodes 202. It should be understood that this example is illustrative, and therefore should not be construed as being limiting in any way.

According to various embodiments of the concepts and technologies disclosed herein, the storage device can include a capacitor or a bank of capacitors that can function as a capacitor charge system, such as the capacitor charge system 216. As illustrated in the embodiment of FIG. 2, the capacitor charge system 216 can include two or more capacitors, such as capacitors 218A-218N. The collection wire 214 can provide an electrical coupling between the capacitor charge system 216 and the flexible ionic diode 202. In some embodiments, the capacitor charge system 216 (or one or more capacitors 218A-218N) can be charged by multiple flexible ionic diodes 202. This arrangement may be used, for example, to reduce a time to obtain an electric charge of a desired level, though this may not necessarily be the case. In some other embodiments, each flexible ionic diode 202 can have a dedicated capacitor charge system 216, if desired (e.g., to provide redundancy, etc.), such as illustrated in the embodiment shown in FIG. 1C. It should be understood that these examples are illustrative, and therefore should not be construed as being limiting in any way.

In some embodiments, the capacitor charge system 216 includes one or more borophene capacitor. For example, in an embodiment where the capacitor 218N is a borophene capacitor, the capacitor charge system 216 can be referred to as a "borophene capacitor charge system." In some embodiments, the capacitor charge system 216 can include two or more borophene capacitors, such as the capacitor 218N. In an embodiment where the capacitor 218N is a borophene capacitor, the capacitor 218N can be formed by two or more borophene plates 222A-222B (hereinafter collectively and/or generically referred to as "borophene plates 222") and an insulating elastic material layer 224 that can be disposed between the borophene plates 222. It can be appreciated that the borophene plates 222 and the insulating elastic material layer 224 can provide flexibility to the capacitor charge system 216. In some embodiments, the capacitor charge system 216 can be disposed, affixed, or otherwise located on the elastic anchor sheet 112. As such, the capacitor charge system 216 can be configured to bend and/or flex in response to the mechanical energy 122 being applied to the elastic anchor sheet 112. In some embodiments, one or more of the capacitors 218A-218N can be flexible, and thus the capacitor charge system 216 also can be flexible. When the borophene sheet 204 is attached to the elastic anchor sheet 112, the borophene sheet 204 can retain its ability to flex, bend, and/or stretch, as well as retain its electric properties. It should be understood that this example is illustrative, and therefore should not be construed as being limiting in any way.

It should be noted that according to various embodiments of the concepts and technologies disclosed herein, a capacitor charge system, such as the capacitor charge system 216, can be fed by one or more collection wires 214. Also, some motion power transducers 200 may have multiple capacitor charge systems 216 that, in turn, can have different charges (e.g., fed by different numbers of collection wires 214) to enable, if desired, multiple voltages or charges. Thus, some embodiments of the motion power transducer 200 can generate and/or store different voltages and/or currents.

The capacitor charge system 216 can include one or more outputs 220. The output 220 can provide power from the capacitor charge system 216 (or from one or more capacitors 218). The inset illustrated in FIG. 2 shows an example of the output 220 from the capacitor charge system 216. The output 220 can include a positive output or terminal and can include a negative output or terminal. In the embodiment illustrated in FIG. 2, the output 220 is shown having a positive output or terminal that can be located at a first of the borophene plates 222 of the capacitor 218N and having a negative output or terminal that can be located at a second of the borophene plates 222 of the capacitor 218N. In some embodiments, the output 220 can be configured to output a charge from the entire capacitor charge system 216 and/or multiple capacitors 218N that have borophene. In some embodiments, multiple borophene plates 222 that can be configured to be charged positively can be connected to a positive output or terminal of the capacitor charge system 216 (e.g., a positive terminal of the output 220), and multiple borophene plates 222 that are configured to be charged negatively can be connected to a negative output or terminal of the capacitor charge system (e.g., a negative terminal of the output 220). It should be understood that these examples are illustrative, and therefore should not be construed as being limiting in any way.

Although the output 220 is shown as being in electrical communication with the capacitor 218N, it must be understood one or more of the outputs 220 can be used with other capacitors 218 within the capacitor charge system 216. As such, the example of the output 220 being connected to the capacitor 218N is for illustration purposes only, and the example should not be construed as being limiting in any way. In various embodiments, more than one output 220 can provide electrical communication from the capacitor charge system 216 and can direct the electrical charge e 111 (e.g., electric current) to the thermostat regulator 118 and/or one or more squeezed-light cooling unit 300 (which will be discussed with respect to FIG. 3).

In some embodiments, activation of a switch, such as the switch 226, that is in electrical communication with the capacitor charge system 216 (or that connects the output 220 to other circuits), can discharge or otherwise release the electric charge e 111 (e.g., current and/or voltage that is stored across one or more of the capacitors 218) through the output 220 and to the thermostat regulator 118 and/or a squeezed-light cooling unit 300. In some embodiments, the thermostat regulator 118 can control the activation of the switch 226, which in turn can direct the electric charge e 111 through the switch 226 and power a squeezed-light cooling unit 300. Thus, in embodiments in which the switch 226 is present and is controlled via the thermostat regulator 118, the squeezed-light cooling unit 300 can be initiated (thereby to initiate and/or regulate thermodynamic cooling using squeezed-light cooling unit 300) based on activation and deactivation of the switch 226. Further discussion of the squeezed-light cooling unit 300 will follow with respect to the discussion of FIG. 3.

FIG. 2 illustrates a motion power transducer 200 that can include one flexible ionic diode 202, two borophene sheets (e.g., the borophene sheet 204 and the borophene sheet 212), one collection wire 214, and one capacitor charge system 216. It should be understood, however, that various implementations of the motion power transducer 200 can include one or more flexible ionic diode 202, two or more borophene sheets (e.g., the borophene sheet 204 and the borophene sheet 212), one or more collection wire 214, and one or more capacitor charge system 216. As such, the illustrated embodiment should be understood as being illustrative, and should not be construed as being limiting in any way.

Figure 3:
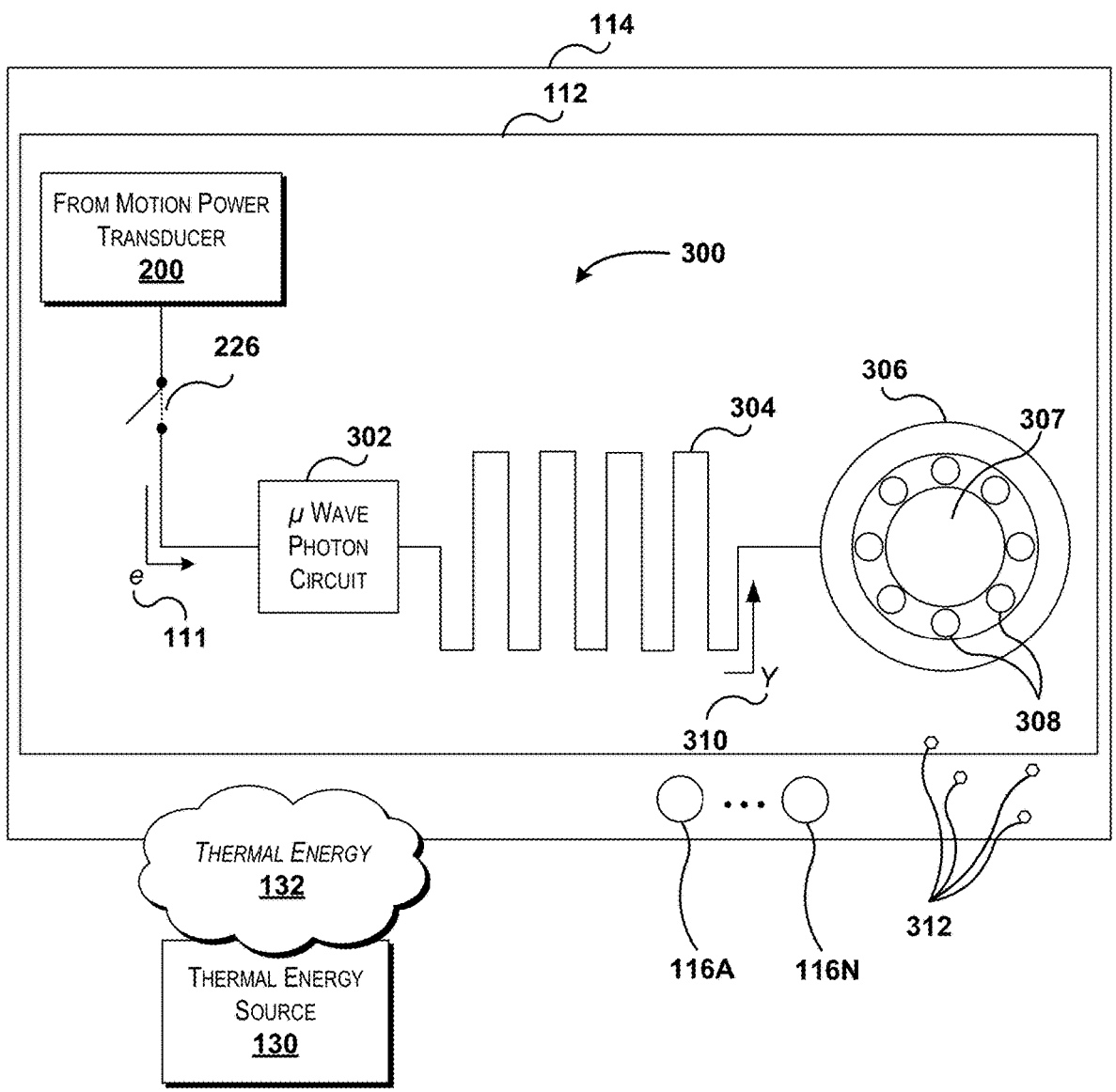
FIG. 3 is a line drawing showing a squeezed-light cooling unit operable in a self-powered squeezed-light temperature regulation system, according to some example embodiments of the concepts and technologies disclosed herein.

Turning now to FIG. 3 with continued reference to FIGS. 1A-1C and FIG. 2, a line drawing showing a squeezed-light cooling unit, such as the squeezed-light cooling unit 300, is disclosed, according to some embodiments of the concepts and technologies disclosed herein. In various embodiments, the squeezed-light cooling unit 300 includes a quantum electrodynamic microwave photon circuit 302 (hereinafter referred to as a "microwave photon circuit 302"), a squeezed-light cooling drum 306, and a photon channel 304. The squeezed-light cooling unit 300 can be attached, located, affixed, and/or disposed on the elastic anchor sheet 112, which in turn can be disposed or otherwise located within the conductive housing 114. In some embodiments, at least some portions of the squeezed-light cooling unit 300 can be located adjacent and/or proximate to the vents 116 of the conductive housing 114. In some embodiments, to facilitate operation of the squeezed-light cooling unit 300, the conductive housing 114 can be configured such that the cavity 113 is an electromagnetic cavity in which at least the squeezed-light cooling unit 300 is disposed, located, or otherwise encapsulated within. In some embodiments, the cavity 113 can become an electromagnetic cavity when the squeezed-light cooling unit 300 is activated and/or otherwise operating (e.g., when the squeezed-light cooling unit 300 is powered).

The squeezed-light cooling unit 300 can be powered, at least partially, by the capacitor charge system 216 of the motion power transducer 200. The microwave photon circuit 302 can draw and/or receive power (e.g., current from the electric charge e 111) stored in a capacitor charge system (e.g., the capacitor charge system 216 that can have one or more borophene capacitors). In some embodiments, a thermostat regulator, such as the thermostat regulator 118 (shown in FIG. 1C and FIG. 2), can control the regulation and/or activation of the switch 226. In response to the switch 226 being activated (e.g., providing an electrical pathway), the electrical charge e 111 (e.g., current and/or voltage) stored in the capacitor charge system 216 can be provided to the squeezed-light cooling unit 300.

The microwave photon circuit 302 can create and/or otherwise generate squeezed-light microwave photons 310. In some embodiments, the squeezed-light microwave photons 310 can be created by two or more of the microwave photon circuits 302. The microwave photon circuit 302 can include a microwave pump that drives a Josephson Parametric Amplifier that can create and can emit squeezed-light microwave photons 310 (labeled in FIG. 3 as Y 310). As used herein, the term "squeezed-light microwave photons" can be used to refer to microwave photons 310 that have been "squeezed," which is intended to mean that the microwave protons 310 are purified (e.g., stripped) of light intensity fluctuations that could cause heating (e.g., thermal noise), thereby reducing inadvertent heating of the squeezed-light cooling drum 306. The amount of "squeezing" applied to the squeezed-light microwave photons 310 can be adjusted by changing the amplitude and phase of the microwave pump driving the Josephson Parametric Amplifier within the microwave photon circuit 302. In some embodiments, the amount of "squeezing" is based on the size of a drum cavity 307 defined by the squeezed-light cooling drum 306 and the frequency at which the drum cavity 307 resonates.

The squeezed-light microwave photons 310 can be directed and/or channeled to the squeezed-light cooling drum 306 via the photon channel 304. The photon channel 304 can be a conduit to provide photonic coupling and/or photonic communication between the microwave photon circuit 302 and the squeezed-light cooling drum 306. As used herein, the phrase "photonic communication", "photonically communicated", "photonically couple", and "photonic coupling" or the like refers to a pathway in which photons (e.g., squeezed-light microwave photons 310) can travel or otherwise propagate from one location to another (e.g., from the microwave photon circuit 302 to the squeezed-light cooling drum 306). In some embodiments, the photon channel 304 can provide the photonic communication and can direct the squeezed-light microwave photons 310 from the microwave photon circuit 302 to the squeezed-light cooling drum 306. In some embodiments, more than one photon channel 304 can photonically couple to one or more squeezed-light cooling drum 306.

The squeezed-light cooling drum 306 can define or otherwise include the drum cavity 307 that can be filled with the squeezed-light microwave photons 310 that were generated and emitted by the microwave photon circuit 302. The squeezed-light cooling drum 306 can be configured to be a microscopic mechanical drum that can vibrate and/or resonate in response to receiving and/or being filled with the squeezed-light microwave photons 310. In some embodiments, the squeezed-light cooling drum 306 can be formed from a microscopic aluminum membrane. In some embodiments, the squeezed-light cooling drum 306 can include a vacuum-gap parallel plate capacitor shunted by a spiral inductor having a pre-defined inductance measured in nanohenries (nH) (e.g., 15 nH, 20 nH, etc.). The squeezed-light cooling drum 306 can be nanoscopic (measured in no more than hundreds of nanometers) and/or microscopic (measured in no more than hundreds of micrometers) in size and be configured as a vibrating mechanical drum that oscillates using the squeezed-light microwave photons 310. In some embodiments, the squeezed-light cooling drum 306 can have a diameter of less than 100 micrometers and a thickness of less than 600 nanometers. It is understood that the illustrated embodiments shown in FIG. 3 are not drawn to scale, and therefore should not be construed as being limiting in any way.

The squeezed-light cooling unit 300 can provide thermodynamic cooling to a thermal energy source, such as the thermal energy source 130, and/or objects in a surrounding operating environment that receive, absorb, or are otherwise affected by the thermal energy 132 from the thermal energy source 130. As illustrated in FIG. 3, the squeezed-light cooling unit 300 can be attached, disposed, or otherwise located at, adjacent to and/or on the elastic anchor sheet 112, and both can be located within the conductive housing 114. The conductive housing 114 and/or squeezed-light cooling unit 300 can be located at or near (i.e., within a defined distance such as less than twelve inches from) one or more thermal energy source 130 and can provide cooling of the thermal energy source 130 and/or surrounding objects in the operating environment. According to various embodiments of the concepts and technologies disclosed herein, the thermal energy source 130 can be a source of the thermal energy 132 that acts upon the self-powered squeezed-light temperature regulation device 110. The thermal energy source 130 can generate heat (e.g., the thermal energy 132) of almost any nature.

Various embodiments of the concepts and technologies disclosed herein provide thermodynamic cooling through the use of the self-powered squeezed-light temperature regulation device 110. In various embodiments, to provide thermodynamic cooling, the self-powered squeezed-light temperature regulation device 110 can include a squeezed-light cooling unit, such as the squeezed-light cooling unit 300, that transfers and/or absorbs the thermal energy 132 (e.g., heat) away from the thermal energy source 130 acting within and/or on an operating environment, such as the operating environment 140. Specifically, the squeezed-light cooling unit 300 can absorb the thermal energy 132 by using the squeezed-light cooling drum 306. This can provide a cooling effect (and thus temperature regulation) for the thermal energy source 130 and/or objects in the surrounding environment (e.g., operating environment 140) that can experience and/or be affected by the thermal energy 132 from the thermal energy source 130. To create a temperature differential between the thermal energy 132 and the squeezed-light cooling drum 306, the squeezed-light cooling unit can generate squeezed-light microwave photons. Specifically, the microwave photon circuit 302 can emit squeezed-light microwave photons 310 into the photon channel 304. The photon channel 304 can direct the squeezed-light microwave photons 310 along an injection path and into the squeezed-light cooling drum 306. The squeezed-light microwave photons 310 are then injected into the drum cavity 307 of the squeezed-light cooling drum 306, which in turn creates resonance in the drum cavity 307, thereby causing the squeezed-light cooling drum 306 to beat or otherwise vibrate. As more squeezed-light microwave photons 310 enter the drum cavity 307, the squeezed-light microwave photons 310 can bounce around and absorb energy from the surfaces defining the drum cavity 307 in the form of heat, which are referred to as phonons (i.e., mechanical units of energy).

As additional squeezed-light microwave photons 310 are received from the photon channel 304, the drum cavity 307 begins to fill, thereby resulting in more of the squeezed-light microwave photons 310 vibrating and/or resonating inside the drum cavity 307. In some embodiments, the squeezed-light microwave photons 310 that have collected and/or otherwise absorbed phonons may be referred to as "carrier squeezed-light microwave photons 312" because they are "carrying" phonons with them when they leak or otherwise escape from the drum cavity 307. As more squeezed-light microwave photons 310 fill the drum cavity 307 and absorb phonons, more of the squeezed-light microwave photons 310 can be considered carrier squeezed-light microwave photons 312. It is understood that the term "carrier squeezed-light microwave photons 312" is used for clarification purposes in the explanation of how squeezed-light microwave photons 310 facilitate temperature regulation. It must be understood that at least some of the squeezed-light microwave photons 310 can leak or otherwise escape from the squeezed-light cooling drum 306 using drum holes 308 to provide and facilitate thermodynamic cooling.

The squeezed-light cooling drum 306 can include one or more of the drum holes 308 that can extend through the surface of the squeezed-light cooling drum 306. The drum holes 308 can provide one or more passages for the carrier squeezed-light microwave photons 312 to travel and escape out of the drum cavity 307. In response to the carrier squeezed-light microwave photons 312 leaking and/or escaping from the drum cavity 307 via one or more of the drum holes 308, the total energy state of the squeezed-light cooling drum 306 (and thus the temperature of the squeezed-light cooling drum 306) can decrease. In some embodiments, the total energy state of the squeezed-light cooling drum 306 due to the carrier squeezed-light microwave photons 312 escaping can be a portion of a single quantum of energy, such as just one-half, one-third, one-fourth, or one-fifth of a single quantum of energy.

As seen in FIG. 3 and previously discussed with respect to FIG. 1B, the conductive housing 114 can define the vents 116. In some embodiments, the carrier squeezed-light microwave photons 312 can escape from the conductive housing 114 via one or more of the vents 116. The vents 116 can allow for the escape of carrier squeezed-light microwave photons 312 by providing a passage out of the conductive housing 114, thereby assisting in thermodynamic cooling and heat transfer. In some embodiments, the one or more vents 116 can be configured to open and/or close via actuation of a shutter that can cover the one or more of the vents 116. In some embodiments, actuation of a shutter to open and/or close one or more of the vents 116 can be in response to activation of the squeezed-light cooling unit 300.

When the energy state (and thus temperature) of the squeezed-light cooling drum 306 decreases, the squeezed-light cooling unit 300 (via the squeezed-light cooling drum 306) can become a heat-sink that can absorb the thermal energy 132 from the thermal energy source 130. As such, the system 100 can use the squeezed-light cooling unit 300 to provide and initiate thermodynamic cooling. In some embodiments, a thermal energy source, such as the thermal energy source 130, may also be the mechanical energy source 120 because the mechanical energy source 120 can provide movements with the mechanical energy 122 having low-frequencies, such as but not limited to frequencies below 1 Hz, which are usable by the motion power transducer 200 to generate an electric charge for the squeezed-light cooling unit 300. According to various embodiments, the self-powered squeezed-light temperature regulation device 110 can be placed on a body (human or animal), put onto or into devices (e.g., Internet of Things devices, communication devices, network devices, other devices, or the like), embedded in various structures, and/or otherwise located in or near any number of machines, structures, devices, or the like. As such, it should be understood that the operating environment 140 of the system 100 can correspond, in various embodiments, to a body, structure, device, or other entity. As such, the above examples are illustrative and should not be construed as being limiting in any way.

Figure 4:
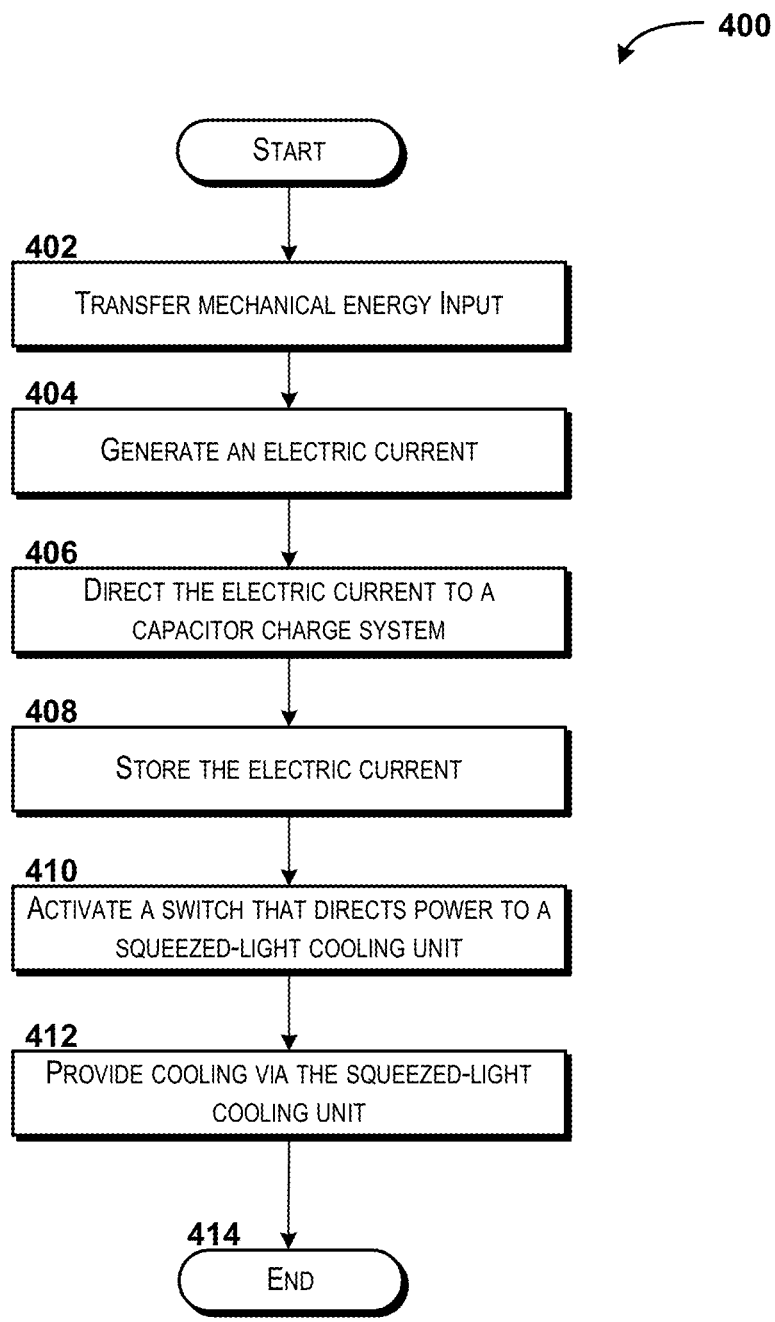
FIG. 4 is a flow diagram showing aspects of a method for temperature regulation using a squeezed-light temperature regulation device, according to an illustrative embodiment of the concepts and technologies described herein.

Turning now to FIG. 4, aspects of a method 400 for providing thermodynamic cooling will be described in detail, according to an illustrative embodiment. Embodiments of method 400 can be implemented, in part or in whole, by concepts and technologies of the system 100 discussed with respect to FIGS. 1A-1C and FIGS. 2-3. It should be understood that the operations of the methods disclosed herein are not necessarily presented in any particular order and that performance of some or all of the operations in an alternative order(s) is possible and is contemplated. It also should be understood that the methods disclosed herein can be ended at any time and need not be performed in its entirety. The operations have been presented in the demonstrated order for ease of description and illustration. Operations may be added, omitted, and/or performed simultaneously, without departing from the scope of the concepts and technologies disclosed herein. It should be understood that devices, such as a powered device 500 discussed with respect to FIG. 5, may be used to facilitate implementation of the functionality described herein via execution of one or more modules, applications, and/or other software including, but not limited to, the thermostat regulator application 520. Thus, the illustrated embodiments are illustrative, and should not be viewed as being limiting in any way.

At least some of the operations of the method 400, and/or substantially equivalent operations, can be facilitated by the execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, powered device, combinations thereof, and the like.

Thus, it should be appreciated that one or more the logical operations described herein are implemented (1) as a sequence of computer implemented acts or program modules running on a computing system (e.g., powered device 500) and/or (2) as interconnected machine logic circuits or circuit modules within and/or communicatively coupled to the computing system (e.g., thermostat regulator 118 communicatively coupled to the powered device 500 via a system bus 512). The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the powered device 500, to perform one or more operations and/or causing the processor to direct other components of and/or communicatively coupled to the computing system or device to perform one or more of the operations, such as commanding the thermostat regulator 118 to activate the switch 226 and direct power to the squeezed-light cooling unit 300.

For purposes of illustrating and describing the concepts of the present disclosure, the method 400 is described herein as being performed by a self-powered squeezed-light temperature regulation device and can operate in an operating environment that has a mechanical energy source and/or a thermal energy source. It should be understood that additional and/or alternative devices and/or network nodes, such as for example execution of a thermostat regulator application, can assist and/or trigger some of the functionality of the self-powered squeezed-light temperature regulation device. Thus, the illustrated embodiments are illustrative, and should not be viewed as being limiting in any way.

The method 400 begins at operation 402. At operation 402, a motion power transducer 200 can transfer or otherwise impart mechanical energy 122 to a flexible ionic diode 202 as a result of a mechanical energy 122 acting on an elastic anchor sheet 112 and/or one or more borophene sheets 204, 212. The mechanical energy 122 can be provided by a movement from a mechanical energy source 120. In various embodiments of the concepts and technologies disclosed herein, the movement can occur at various frequencies including, but not limited to, a frequency of less than one 1 Hz up to 20 Hz. In some embodiments, the frequencies can be a portion of 1 Hz (e.g., 0.1 Hz, 0.1 µHz, etc.). As explained above with respect to FIGS. 1A-1C and FIG. 2-3, the motion power transducer 200 can be coupled and/or otherwise disposed on and/or located adjacent to the elastic anchor sheet 112. In some embodiments, the motion power transducer 200 and the elastic anchor sheet 112 can be located within a conductive housing 114. In various embodiments, the elastic anchor sheet 112 and/or the conductive housing 114 can be formed from borophene. In some embodiments, the motion power transducer 200 can be acted on by the movement via a transfer of mechanical energy 122 associated with the movement from the conductive housing 114 and/or the elastic anchor sheet 112.

From operation 402, the method 400 can proceed to operation 404. At operation 404, the motion power transducer 200 can generate an electric current as a result of the mechanical energy 122 from movements acting on the flexible ionic diode 202. In some embodiments, the motion power transducer 200 generates the electric current using a flexible ionic diode 202 that can be located between two borophene sheets, such as the borophene sheet 204 and the borophene sheet 212. As explained above, one or more of the borophene sheets 204, 212 can be one atom thick or thicker. In some embodiments, the motion power transducer 200 (using the flexible ionic diode 202 and the borophene sheets 204, 212) can generate maximum power density output when acted on by mechanical energy generated by low-frequency movements, for example without limitation, movements at frequencies of less than 1 Hz (e.g., 0.1 Hz, 0.2 Hz, 0.25 Hz, 0.1 µHz, etc.). One or more of the borophene sheets 204, 212 can collect the electric current generated by the motion power transducer 200.

From operation 404, the method 400 can proceed to operation 406. At operation 406, a collection wire 214 can be in electrical communication with a capacitor charge system 216, and thus can direct the electric charge e 111 (e.g., electric current and/or voltage generated by the motion power transducer 200 and captured one or more of the borophene sheets 204, 212) to the capacitor charge system 216 disclosed herein. In some embodiments, the collection wire 214 can direct the electric charge e 111 to more than one capacitor charge system 216.

From operation 406, the method 400 can proceed to operation 408. At operation 408, the capacitor charge system 216 can store the electric current generated by the motion power transducer 200. In some embodiments, the capacitor charge system 216 can store currents and/or voltages using one or more of the capacitors 218A-218N. In some embodiments, the capacitor charge system 216 can include one or more capacitor 218N that has borophene plates 222.

From operation 408, the method 400 can proceed to operation 410. At operation 412, the thermostat regulator 118 can activate a switch 226. The switch 226 can direct power (e.g., the electric charge e 111 that can be electric current and/or voltage) to a squeezed-light cooling unit 300. In some embodiments, the thermostat regulator 118 can include an analog circuit that reacts to temperature fluctuations and can be configured to activate a switch 226 when a temperature threshold is met or exceeded. In some embodiments, the thermostat regulator 118 can receive a command signal that triggers activation of the switch 226. In some embodiments, the command signal can be provided by a device (such as the powered device 500 that is described in more detail below with reference to FIG. 5) in electrical communication with the thermostat regulator 118 when the device determines that a temperature threshold has been met or exceeded. The thermostat regulator 118 can activate the switch 226 by closing a circuit connection electrically coupling the squeezed-light cooling unit 300 to the capacitor charge system 216 of the motion power transducer 200. As such, the squeezed-light cooling unit 300 can receive power and begin and/or continue thermodynamic cooling.

From operation 410, the method 400 can proceed to operation 412. At operation 412, the squeezed-light cooling unit 300 can provide cooling to an operating environment 140 and/or a thermal energy source 130, such as but not limited to, the powered device 500. The squeezed-light cooling unit 300 can receive power from the electric charge e 111 generated by the capacitor charge system 216. The squeezed-light cooling unit 300 can include a squeezed-light cooling drum 306 that can be photonically coupled to a microwave photon circuit 302, as discussed above with respect to FIG. 3. As discussed above with respect to FIG. 3, the microwave photon circuit 302 can generate squeezed-light microwave photons 310 that can be directed into a drum cavity 307 of the squeezed-light cooling drum 306. As the squeezed-light microwave photons 310 fill the drum cavity 307, the squeezed-light microwave photons 310 can collect thermal energy in the form of phonons, thereby decreasing the temperature of the squeezed-light cooling drum 306 and creating a heat sink for the thermal energy source 130 and/or operating environment 140. Thermal energy 132 from the thermal energy source 130 can be absorbed by the squeezed-light cooling drum 306 and can leak and/or otherwise escape from the squeezed-light cooling drum 306 via one or more drum holes 308, thereby providing cooling to the thermal energy source 130 and/or operating environment 140. In some embodiments, the thermostat regulator can deactivate the switch 226, thereby cutting and/or pausing the delivery of power to the squeezed-light cooling unit 300. The deactivation of the switch 226 can stop, reduce, and/or pause the thermodynamic cooling provided to the thermal energy source 130 by the squeezed-light cooling unit 300. It is understood that one or more squeezed-light cooling units 300 can be activated to provide thermodynamic cooling. In some embodiments, the squeezed-light cooling unit 300 can be affixed and/or located on and/or adjacent to the elastic anchor sheet 112 and can be disposed or otherwise located within the conductive housing 114.

From operation 412, the method 400 can proceed to operation 414. The method 400 can end at operation 414.

FIG. 5 is a block diagram illustrating the powered device 500 operable to provide an example operating environment (e.g., operating environment 140 of FIG. 1A) in which embodiments of the self-powered squeezed-light temperature regulation device (e.g., self-powered squeezed-light temperature regulation device 110 of FIG. 1A) can be located, according to various embodiments of the concepts and technologies disclosed herein. In some embodiments, the powered device 500 may be considered a "wireless device" because it may not continuously rely on directly wired connections for power and/or communicative functions. The powered device 500 may be the mechanical energy source 120 and/or thermal energy source 130 discussed in FIG. 1A and FIGS. 2-3 and may provide the mechanical energy 122 and/or the thermal energy 132 that can be used by the system 100. The powered device 500 may also be considered as an embodiment of an operating environment in which the system 100 can provide temperature regulation. The powered device 500 includes a processing unit 502, a memory 504, one or more user interface devices 506, one or more input/output ("I/O") devices 508, one or more of the system 100 (having a conductive housing 114, and the thermostat regulator 118 electrically coupled to a motion power transducer 200 and squeezed-light cooling unit 300 discussed with respect to FIGS. 2-3), and one or more network devices 510, each of which is operatively connected to the system bus 512. The system bus 512 enables bi-directional communication between the processing unit 502, the memory 504, the user interface devices 506, the I/O devices 508, the thermostat regulator 118, and the network devices 510.

The processing unit 502 can include a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 504 can communicate with the processing unit 502 via the system bus 512. In some embodiments, the memory 504 can be operatively connected to a memory controller (not shown) that can enable communication with the processing unit 502 via the system bus 512. The memory 504 can include an operating system 514 and one or more program modules 516. The operating system 514 can include, but is not limited to, members of the WINDOWS families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like. The operating system 514 also can include custom operating systems.

The program modules 516 can include various software and/or program modules that can provide the functionality described herein. In some embodiments, for example, the program modules 516 can include a temperature threshold 518 as a data structure, a thermostat regulator application 520, or other applications, routines, modules, or programs that can encompass functionality as illustrated and described herein. These and/or other routines, modules, applications, or programs can be embodied in computer-readable media containing instructions that, when executed by the processing unit 502, can facilitate performance of one or more operations of method 400 by the system 100 described in detail above with respect to FIG. 4, such as in some embodiments by thermostat regulator application 520 providing a command signal to the thermostat regulator 118 to trigger activation of switch 226, and/or other functionality as illustrated and described herein. It can be appreciated that, at least by virtue of the features embodying one or more operations and/or other functionality performed by the powered device 500 can be stored in the memory 504 and/or accessed and/or executed by the processing unit 502. The processing unit 502 of the powered device 500 is a special-purpose processing unit that can facilitate providing the functionality illustrated and described herein. According to embodiments, the program modules 516 may be embodied in hardware, software, firmware, or any combination thereof. Although not shown in FIG. 5, it should be understood that the memory 504 also can be configured to store other data, if desired.

In some embodiments, the program modules stored in the memory 504 include the temperature thresholds 518. The temperature thresholds 518 can include one or more values included in data structures that are stored in the memory 504. The values can be readable by the processing unit 502. The temperature thresholds 518 can correspond to triggers for the thermostat regulator application 520 to use in determining whether a command signal should be sent to the thermostat regulator 118 that can initiate activation of a switch 226. For example, the thermostat regulator application 520 can be executed by the processing unit 502 and may monitor the temperature of the thermal energy 132 (e.g., heat) from a thermal energy source 130, such as but not limited to the processing unit 502. In some embodiments, the thermostat regulator application 520 communicates with the operating system 514 via the system bus 512. The powered device 500 may be exposed to thermal energy source 130, which may be an external heat source and/or a component of the powered device 500 that can generate heat, such as, for example, the processing unit 502. The thermostat regulator application 520 may receive indications of a current operating temperature of the thermal energy source 130 (e.g., the processing unit 502). The indications may be in the form of messages and/or metadata defining a temperature value. The thermostat regulator application 520 can obtain the temperature thresholds 518 from the memory 504. If the current operating temperature of the thermal energy source 130 meets or exceeds a temperature threshold 518 associated with the thermal energy source 130, then the thermostat regulator application 520 may determine and/or may detect that the temperature threshold 518 has been met or exceeded. The thermostat regulator application 520 can trigger the system 100 to initiate thermodynamic cooling of the thermal energy source 130 (in this example, the processing unit 502) by sending a command signal to the thermostat regulator 118 to indicate that a threshold temperature has been met or exceeded, thereby triggering the thermostat regulator 118 to activate switch 226. The thermostat regulator application 520 may communicate with the system 100 via the system bus 512 (specifically communicate with the thermostat regulator 118) to initiate thermodynamic cooling via the system 100. In turn, the thermostat regulator 118 of the system 100 can activate a switch 226 (also of the system 100) that directs power (e.g., electric current and/or voltage generated by a motion power transducer 200) to a squeezed-light cooling unit 300 of the system 100. By this, the system 100 can provide thermodynamic cooling to the thermal energy source 130. It should be understood that this example is illustrative, and therefore should not be construed as being limiting in any way.

By way of example, and not limitation, computer-readable media may include any available computer storage media or communication media that can be accessed by the powered device 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the powered device 500. In the claims, the phrase "computer storage medium" and variations thereof does not include waves or signals per se and/or transitory communication media.

The user interface devices 506 may include one or more devices with which a user accesses the powered device 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the powered device 500 to communicate with other networks or remote systems via a network, such as the network 522. Examples of the network devices 510 include, but are not limited to, a modem, a radio frequency ("RF") or infrared ("IR") transceiver, a telephonic interface, a bridge, a router, or a network card. The network 522 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 522 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

The powered device 500 also can include other hardware 524. The other hardware 524 can be controlled by the processing unit 502 and can be used to detect ambient and/or operating temperatures outside of and/or within the operating environment of the system 100 (in this example the operating environment can include the powered device 500 illustrated and described herein). Thus, for example, the other hardware 524 can include temperature sensors, digital thermometers, exhaust fans, temperature probes, thermocouples, temperature devices and/or structures for providing temperature readings to the thermostat regulator application 520 and/or the thermostat regulator 118 as illustrated and described herein, combinations thereof, or the like.

Figure 6:
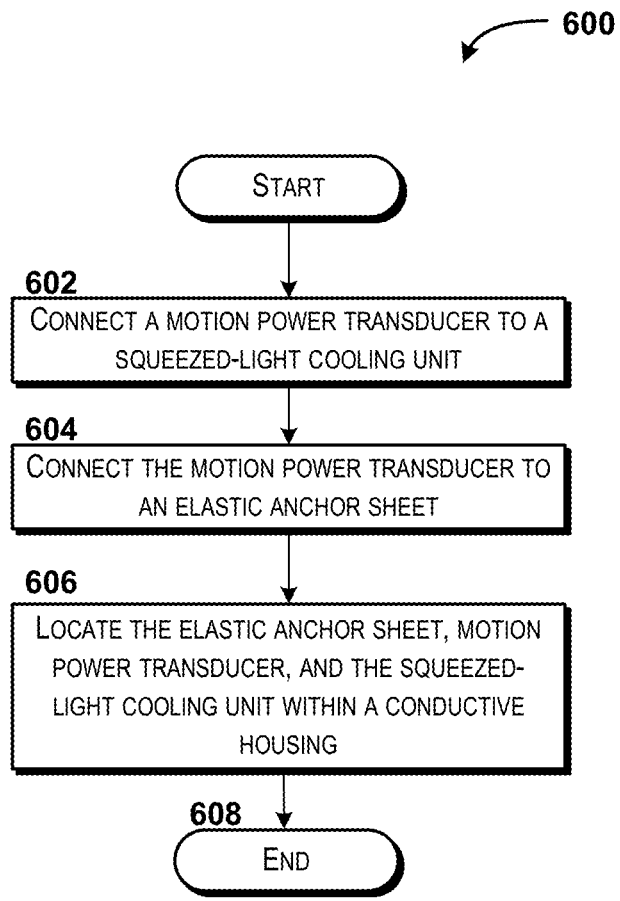
FIG. 6 is a flow diagram showing aspects of a method for assembly of a squeezed-light temperature regulation device, according to an illustrative embodiment of the concepts and technologies described herein.

Turning now to FIG. 6, a method for assembly of a squeezed-light temperature regulation device, such as the squeezed-light temperature regulation device 110, is disclosed, according to an illustrative embodiment of the concepts and technologies described herein. For purposes of illustrating and describing the concepts of the present disclosure, the method 600 is described herein as being performed by a self-powered squeezed-light temperature regulation manufacturing device via execution of one or more software modules, such as but not limited to an assembly routine 526. In an embodiment, the self-powered squeezed-light temperature regulation manufacturing device can include a computer system, such as an embodiment of the powered device 500. It should be understood that additional and/or alternative devices and/or network nodes can provide the functionality described herein via execution of one or more modules, applications, and/or other software including, but not limited to, the assembly routine 526 or an assembly application 528 stored in memory (e.g., memory 504). Thus, the illustrated embodiments are illustrative, and should not be viewed as being limiting in any way.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as a self-powered squeezed-light temperature regulation manufacturing device, to perform one or more operations and/or causing the processor to direct other components of the computing system or device to perform one or more of the operations.

The method 600 begins at operation 602. At operation 602, the self-powered squeezed-light temperature regulation manufacturing device can execute the assembly application 528 and/or assembly routine 526 and in response, connect a motion power transducer 200 to a squeezed-light cooling unit 300. In one contemplated embodiment, the connection can provide electrical communication between the motion power transducer 200 and the squeezed-light cooling unit 300.

From operation 602, the method 600 can proceed to operation 604. At operation 604, the self-powered squeezed-light temperature regulation manufacturing device can connect the motion power transducer 200 to an elastic anchor sheet 112. For example, the motion power transducer 200 may be affixed and/or otherwise coupled to the elastic anchor sheet 112 such that as a result of movements with mechanical energy 122 acting on the elastic anchor sheet 112, the mechanical energy 122 can be transferred, translated, or otherwise act upon the motion power transducer 200 to generate an electric charge e 111 by using a flexible ionic diode 202. In some embodiments, an adhesive can be used to connect the motion power transducer 200 to the elastic anchor sheet 112.

From operation 604, the method 600 can proceed to operation 606. At operation 606, the self-powered squeezed-light temperature regulation manufacturing device can locate the elastic anchor sheet 112, the motion power transducer 200, and the squeezed-light cooling unit 300 within a conductive housing 114. For example, the elastic anchor sheet 112, the motion power transducer 200, and the squeezed-light cooling unit 300 can be placed in and/or under a cavity 113 of the conductive housing 114. In some embodiments, the conductive housing 114 can be configured to provide an electromagnetic charge, thereby enabling the cavity 113 to be an electromagnetic cavity.

From operation 606, the method 600 can proceed to operation 608. The method 600 can end at operation 608.

Based on the foregoing, it should be appreciated that self-powered squeezed-light temperature regulation systems, device, and methods or operation and manufacture have been disclosed herein. Although the subject matter presented herein has been described in language specific to thermodynamic, electrical, and/or computer structural features, methodological and transformative acts, specific thermodynamic, electrical, and/or computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   generating, by a motion power transducer of a temperature regulation device, an electric charge from movements acting on the motion power transducer;
   directing, by the temperature regulation device, the electric charge to a squeezed-light cooling unit of the temperature regulation device; and
   generating, by the squeezed-light cooling unit, squeezed-light microwave photons to provide temperature regulation via thermodynamic cooling.

2. The method of claim 1, wherein the motion power transducer comprises a flexible ionic diode that is located between a first borophene sheet and a second borophene sheet.

3. The method of claim 1, wherein the motion power transducer is attached to an elastic anchor sheet of the temperature regulation device, and wherein at least the elastic anchor sheet transfers the movements to the motion power transducer.

4. The method of claim 1, wherein the movements occur at a frequency less than one hertz.

5. The method of claim 1, further comprising directing the electric charge generated by the motion power transducer from the motion power transducer to a capacitor charge system.

6. The method of claim 5, wherein the electric charge generated by the motion power transducer is directed from the motion power transducer to the capacitor charge system via a collection wire that is in electrical communication with the capacitor charge system.

7. The method of claim 5, further comprising storing, by the capacitor charge system, the electric charge generated by the motion power transducer.

8. The method of claim 7, wherein directing the electric charge to the squeezed-light cooling unit of the temperature regulation device comprises directing the electric charge from the capacitor charge system to the squeezed-light cooling unit in response to activation of a switch.

9. A temperature regulation device comprising
   a motion power transducer that generates an electric charge from movements acting on the motion power transducer;
   a capacitor charge system that stores the electric charge generated by the motion power transducer; and
   a squeezed-light cooling unit that is powered by the electric charge generated by the motion power transducer, wherein the squeezed-light cooling unit creates squeezed-light microwave photons to provide temperature regulation via thermodynamic cooling.

10. The temperature regulation device of claim 9, wherein the motion power transducer comprises a flexible ionic diode that is located between a first borophene sheet and a second borophene sheet.

11. The temperature regulation device of claim 9, wherein the capacitor charge system comprises two borophene capacitors.

12. The temperature regulation device of claim 9, wherein the motion power transducer, the capacitor charge system, and the squeezed-light cooling unit are located within a conductive housing.

13. The temperature regulation device of claim 12, wherein the conductive housing comprises at least one vent through which at least a portion of the squeezed-light microwave photons escape from the conductive housing.

14. The temperature regulation device of claim 9, wherein the squeezed-light cooling unit comprises:
   a microwave photon circuit that creates the squeezed-light microwave photons; and
   a squeezed-light cooling drum that is in photonic communication with the microwave photon circuit, wherein the squeezed-light cooling drum comprises a drum cavity and a plurality of drum holes through which at least a portion of the squeezed-light microwave photons leak from the drum cavity.

15. The temperature regulation device of claim 9, further comprising an elastic anchor sheet, wherein the motion power transducer is connected to the elastic anchor sheet.

16. The temperature regulation device of claim 15, wherein at least the elastic anchor sheet transfers the movements to the motion power transducer.

17. A method comprising:
   generating, by a motion power transducer of a temperature regulation device, an electric charge from movements acting on the motion power transducer;
   directing, by the motion power transducer, the electric charge generated by the motion power transducer from the motion power transducer to a capacitor charge system, wherein the capacitor charge system stores the electric charge;
   in response to activation of a switch of the motion power transducer by a thermostat regulator of the motion power transducer, directing, by the temperature regulation device, the electric charge from the capacitor charge system to a squeezed-light cooling unit of the temperature regulation device; and
   generating, by the squeezed-light cooling unit, squeezed-light microwave photons to provide temperature regulation via thermodynamic cooling.

18. The method of claim 17, wherein the motion power transducer comprises a flexible ionic diode that is located between a first borophene sheet and a second borophene sheet.

19. The method of claim 17, wherein the motion power transducer is attached to an elastic anchor sheet of the temperature regulation device, and wherein at least the elastic anchor sheet transfers the movements to the motion power transducer.

20. The method of claim 17, wherein the movements occur at a frequency less than one hertz.

* * * * *